(12) United States Patent
Kawano et al.

(10) Patent No.: US 11,398,221 B2
(45) Date of Patent: Jul. 26, 2022

(54) INFORMATION PROCESSING APPARATUS, INFORMATION PROCESSING METHOD, AND PROGRAM

(71) Applicant: Sony Corporation, Tokyo (JP)

(72) Inventors: Shinichi Kawano, Tokyo (JP); Hiro Iwase, Kanagawa (JP); Yuhei Taki, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 115 days.

(21) Appl. No.: 16/969,979

(22) PCT Filed: Nov. 30, 2018

(86) PCT No.: PCT/JP2018/044288
§ 371 (c)(1),
(2) Date: Aug. 14, 2020

(87) PCT Pub. No.: WO2019/163247
PCT Pub. Date: Aug. 29, 2019

(65) Prior Publication Data
US 2020/0402498 A1      Dec. 24, 2020

(30) Foreign Application Priority Data
Feb. 22, 2018  (JP) .............................. JP2018-029347

(51) Int. Cl.
*G10L 15/00*      (2013.01)
*G10L 15/02*      (2006.01)

(52) U.S. Cl.
CPC .................................. *G10L 15/02* (2013.01)

(58) Field of Classification Search
CPC ...... G10L 15/02; G10L 15/18; G10L 15/1815; G10L 2015/227; G10L 13/00;
(Continued)

(56) References Cited

U.S. PATENT DOCUMENTS 5,893,059 A *   4/1999   Raman .................. G10L 15/063
                                                                704/256.2
8,457,959 B2 *  6/2013   Kaiser .................... G09B 19/04
                                                                704/231
(Continued)

FOREIGN PATENT DOCUMENTS

EP     3598437 A1    1/2020
EP     3751393 A1    12/2020
(Continued)

OTHER PUBLICATIONS

International Search Report and Written Opinion dated Feb. 19, 2019 for PCT/JP2018/044288 filed on Nov. 30, 2018, 12 pages including English Translation of the International Search Report.

*Primary Examiner* — Khai N. Nguyen
(74) *Attorney, Agent, or Firm* — Xsensus LLP

(57) ABSTRACT

[Problem] There are proposed an information processing apparatus, an information processing method, and a program, which are capable of learning a meaning corresponding to a speech recognition result of a first speech adaptively to a determination result as to whether or not a second speech is a restatement of the first speech.
[Solution] An information processing apparatus including: a learning unit configured to learn, based on a determination result as to whether or not a second speech collected at second timing after first timing is a restatement of a first speech collected at the first timing, a meaning corresponding to a speech recognition result of the first speech.

20 Claims, 28 Drawing Sheets

(58) Field of Classification Search
CPC ......... G10L 15/00; G10L 17/00; G10L 19/00; G10L 21/00; G10L 25/00; G10L 99/00
USPC ........................................................ 704/236
See application file for complete search history.

(56) References Cited

U.S. PATENT DOCUMENTS

| | | | | |
|---|---|---|---|---|
| 9,344,878 | B2* | 5/2016 | Kang | ................ H04M 1/72439 |
| 9,479,911 | B2* | 10/2016 | Kang | ...................... H04W 4/18 |
| 10,056,081 | B2* | 8/2018 | Kunitake | ................ G10L 25/51 |
| 10,319,368 | B2* | 6/2019 | Ushio | ..................... G06F 40/30 |
| 10,354,642 | B2* | 7/2019 | Gurunath Kulkarni | ..................... G10L 25/51 |
| 10,446,141 | B2* | 10/2019 | Krishnamoorthy | ..... G10L 15/02 |
| 10,446,146 | B2* | 10/2019 | Fujii | .................. G10L 15/063 |
| 10,482,885 | B1* | 11/2019 | Moniz | ..................... G06F 3/167 |
| 10,546,578 | B2* | 1/2020 | Kim | ........................ G10L 15/22 |
| 10,567,515 | B1* | 2/2020 | Bao | ........................ G10L 15/22 |
| 10,600,406 | B1* | 3/2020 | Shapiro | ................ G10L 15/22 |
| 10,715,604 | B1* | 7/2020 | Bao | ....................... H04L 67/306 |
| 11,151,899 | B2* | 10/2021 | Pitschel | ................. G09B 19/06 |
| 2007/0162281 | A1 | 7/2007 | Saitoh | |
| 2008/0077387 | A1* | 3/2008 | Ariu | ........................ G10L 15/22 704/E15.04 |
| 2012/0035924 | A1 | 2/2012 | Jitkoff | |
| 2013/0304457 | A1* | 11/2013 | Kang | ................ H04M 1/72439 704/201 |
| 2014/0244263 | A1 | 8/2014 | Pontual | |
| 2014/0272821 | A1* | 9/2014 | Pitschel | ................. G09B 19/06 434/157 |
| 2014/0278413 | A1 | 9/2014 | Pitschel | |
| 2016/0063998 | A1* | 3/2016 | Krishnamoorthy | ..... G10L 15/22 704/254 |
| 2017/0046326 | A1* | 2/2017 | Waibel | .................. G06F 3/0486 |
| 2017/0140754 | A1 | 5/2017 | Ichimura | |
| 2017/0148441 | A1* | 5/2017 | Fujii | ................... G10L 15/1815 |
| 2017/0186428 | A1* | 6/2017 | Kunitake | ................ G10L 17/06 |
| 2017/0365252 | A1* | 12/2017 | Ushio | .................... G10L 15/063 |
| 2018/0182383 | A1* | 6/2018 | Kim | ........................ G10L 15/22 |
| 2018/0254035 | A1* | 9/2018 | Kulkarni | ................ G10L 15/22 |
| 2020/0013403 | A1* | 1/2020 | Sugiyama | ............... G06F 3/017 |
| 2020/0027366 | A1* | 1/2020 | Kim | ..................... G06Q 50/205 |
| 2020/0402498 | A1* | 12/2020 | Kawano | ................ G10L 15/18 |

FOREIGN PATENT DOCUMENTS

| | | |
|---|---|---|
| JP | 2006-215317 A | 8/2006 |
| JP | 2007-213005 A | 8/2007 |
| JP | 2016-180916 A | 10/2016 |
| WO | 2016/147401 A1 | 9/2016 |
| WO | 2016/151699 A1 | 9/2016 |

\* cited by examiner

INFORMATION PROCESSING APPARATUS, INFORMATION PROCESSING METHOD, AND PROGRAM

CROSS-REFERENCE TO RELATED APPLICATIONS

The present application is based on PCT filing PCT/JP2018/044288, filed Nov. 30, 2018, which claims priority to JP 2018-029347, filed Feb. 22, 2018, the entire contents of each are incorporated herein by reference.

FIELD

The present disclosure relates to an information processing apparatus, an information processing method, and a program.

BACKGROUND

Heretofore, various techniques regarding speech recognition have been proposed. In the speech recognition, a speech at the time of a user's utterance can be converted into a character string.

For example, Patent Literature 1 below describes a technique for determining whether or not an input audio signal includes a restated utterance.

CITATION LIST

Patent Literature

Patent Literature 1: JP 2016-180917 A

SUMMARY

Technical Problem

However, in the technique described in Patent Literature 1, it is not considered to learn a meaning corresponding to a speech recognition result of a first speech adaptively to a determination result as to whether or not a second speech collected after the first speech is a restatement of the first speech.

Accordingly, in the present disclosure, there are proposed an information processing apparatus, an information processing method, and a program, which are novel, improved and capable of learning the meaning corresponding to the speech recognition result of the first speech adaptively to the determination result as to whether or not the second speech is a restatement of the first speech.

Solution to Problem

According to the present disclosure, an information processing apparatus is provided that includes: a learning unit configured to learn, based on a determination result as to whether or not a second speech collected at second timing after first timing is a restatement of a first speech collected at the first timing, a meaning corresponding to a speech recognition result of the first speech.

Moreover, according to the present disclosure, an information processing method is provided that includes: causing a processor to learn, based on a determination result as to whether or not a second speech collected at second timing after first timing is a restatement of a first speech collected at the first timing, a meaning corresponding to a speech recognition result of the first speech.

Moreover, according to the present disclosure, a program is provided that causes a computer to function as a learning unit configured to learn, based on a determination result as to whether or not a second speech collected at second timing after first timing is a restatement of a first speech collected at the first timing, a meaning corresponding to a speech recognition result of the first speech.

As described above, according to the present disclosure, the meaning corresponding to the speech recognition result of the first speech can be learned adaptively to the determination result as to whether or not the second speech is a restatement of the first speech. Note that the effects described herein are not necessarily limited, and may be any of the effects described in the present disclosure.

DESCRIPTION OF EMBODIMENTS

Figure 1:
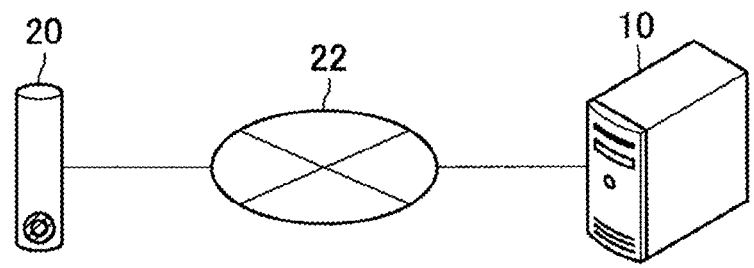
FIG. 1 is an explanatory diagram illustrating a configuration example of an information processing system according to an embodiment of the present disclosure.

Hereinafter, preferred embodiments of the present disclosure will be described in detail with reference to the accompanying drawings. In this description and the drawings, components having substantially the same function and configuration are denoted by the same reference numerals, and a redundant description is omitted.

In this description and the drawings, a plurality of components having substantially the same function and configuration may be distinguished from each other by assigning a different alphabet after the same reference numeral. For example, a plurality of components having substantially the same functional configuration are distinguished as necessary, such as a terminal 20a and a terminal 20b. However, when it is not necessary to particularly distinguish each of the plurality of components having substantially the same functional configuration from others, only the same reference numeral is assigned. For example, when it is not necessary to particularly distinguish the terminal 20a and the terminal 20b from each other, the terminals 20a and 20b are simply referred to as terminals 20.

Further, "mode for carrying out the invention" will be described in order of items illustrated below.
1. Configuration of information processing system
2. Detailed description of embodiment
3. Application example
4. Hardware configuration
5. Modification 1. Configuration of Information Processing System First, a configuration example of an information processing system according to an embodiment of the present disclosure will be described with reference to FIG. 1. As illustrated in FIG. 1, the information processing system according to the present embodiment includes a server 10, a terminal 20, and a communication network 22.

1-1. Server 10

The server 10 is an example of an information processing apparatus according to the present disclosure. The server 10 may have a speech recognition function. For example, the server 10 is capable of receiving a speech, which is collected by the terminal 20 to be described later, from the terminal 20 via the communication network 22, recognizing the speech, and analyzing the meaning of a speech recognition result.

Further, the server 10 can control the terminal 20 to output various types of information. For example, the server 10 causes the terminal 20 to output a predetermined moving image or a predetermined speech based on a user's instruction or the like.

1-2. Terminal 20

The terminal 20 outputs various types of information in accordance with the control of the server 10, for example. For example, this terminal 20 may be a general-purpose personal computer (PC), a tablet device, a game machine, a mobile phone such as a smartphone, a portable music player, a speaker, a projector, a wearable device, for example, such as a head mounted display (HMD) and a smart watch, an in-vehicle device (such as a car navigation device), or a robot (for example, a humanoid robot or a self-driving car).

Figure 2:
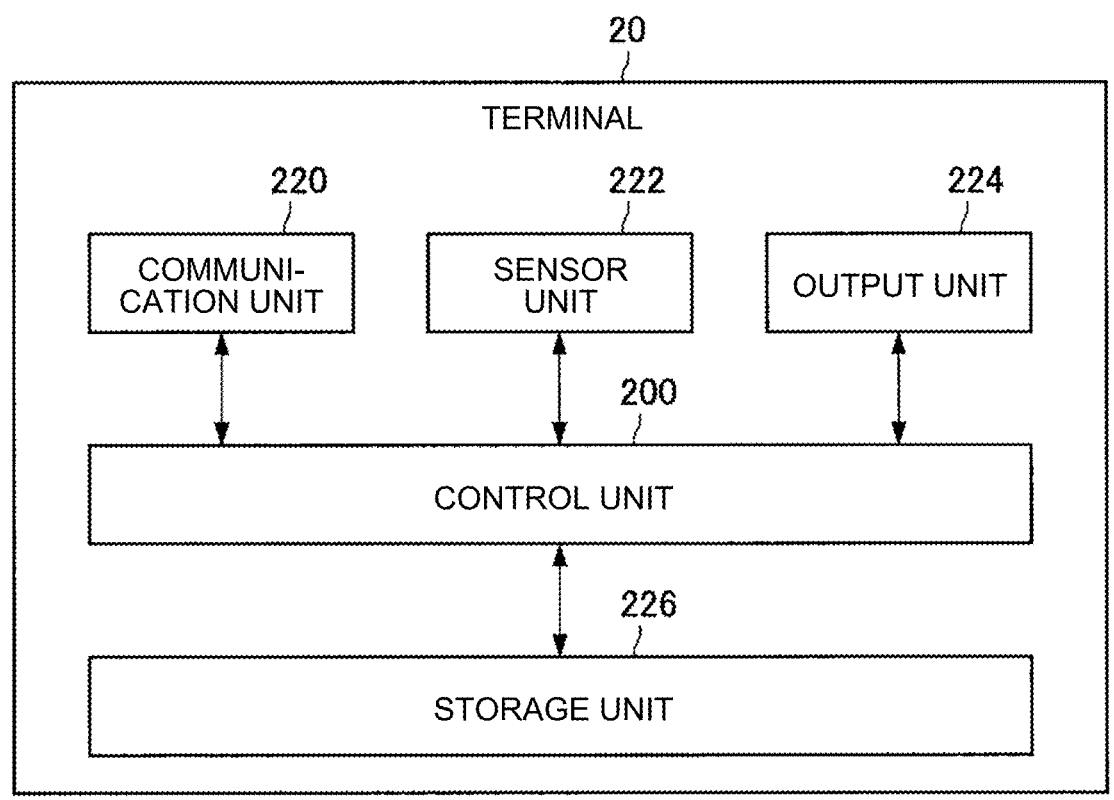
FIG. 2 is a block diagram illustrating a functional configuration example of a terminal 20 according to the present embodiment.

Here, a functional configuration of the terminal 20 is described with reference to FIG. 2. FIG. 2 is a block diagram illustrating a functional configuration example of the terminal 20. As illustrated in FIG. 2, the terminal 20 includes a control unit 200, a communication unit 220, a sensor unit 222, an output unit 224, and a storage unit 226.

{1-2-1. Control Unit 200}

For example, the control unit 200 can be configured to include a processing circuit such as a central processing unit (CPU) and a graphics processing unit (GPU). The control unit 200 controls the operation of the terminal 20 as a whole. For example, the control unit 200 causes the communication unit 220 to transmit, to the server 10, various sensing results sensed by the sensor unit 222 to be described later. Further, the control unit 200 causes the output unit 224 to output information, which is specified by the output control information, in accordance with output control information received from the server 10.

{1-2-2. Sensor Unit 222}

The sensor unit 222 can have a microphone. The sensor unit 222 can collect speeches emitted in the vicinity.

Further, for example, the sensor unit 222 may include at least one of a camera (image sensor), a distance sensor (for example, a time-of-flight type sensor, a stereo camera, or the like), a temperature sensor, a biosensor, an acceleration sensor, a direction sensor, and a myoelectric sensor Further, the sensor unit 222 may further include a receiver that receives a positioning signal from a positioning satellite such as, for example, a global positioning system (GPS) and a global navigation satellite system (GLONASS).

Individual sensors included in the sensor unit 222 may always perform sensing, or may periodically perform the sensing, or may perform the sensing only in a specific case (for example, when there is an instruction from the control unit 200, or the like).

{1-2-3. Communication Unit 220}

The communication unit 220 transmits and receives information to and from another device by, for example, wireless communication and/or wired communication. For example, the communication unit 220 transmits various sensing results (for example, audio data collected by a microphone), which are acquired by the sensor unit 222, to the server 10 in accordance with the control of the control unit 200. In addition, the communication unit 220 receives output control information of various images and various sounds from the server 10.

{1-2-4. Output Unit 224}

The output unit 224 outputs various types of information (such as a video and a sound) in accordance with the control of the control unit 200. The output unit 224 may include an audio output unit. The audio output unit is configured to include, for example, a speaker, an earphone, or a headphone. The audio output unit outputs a sound (speech, music, or the like) in accordance with the control of the control unit 200.

Further, the output unit 224 may include a display unit. The display unit is configured to include, for example, a liquid crystal display (LCD), an organic light emitting diode (OLED), or a projector. The display unit displays (projects, and so on) a video in accordance with the control of the control unit 200.

{1-2-5. Storage Unit 226}

The storage unit 226 stores various data and various software.

1-3. Communication Network 22

The communication network 22 is a wired or wireless transmission path for information transmitted from a device connected to the communication network 22. For example, the communication network 22 may include a public line network such as a telephone line network, the Internet, and a satellite communication network, various local area networks (LANs) including Ethernet (registered trademark), a wide area network (WAN), and the like. Further, the communication network 22 may include a dedicated line network such as an Internet protocol-virtual private network (IP-VPN).

1-4. Summary of Issues

The configuration of the information processing system according to the present embodiment has been described above. Incidentally, in a system operated by an utterance, even if a user tries to speak an utterance acceptable by the system (hereinafter, this is sometimes referred to as "InDomain"), the system sometimes may determine that the utterance is out of an acceptance range (hereinafter, this is sometimes referred to as "OutOfDomain (OOD)"). Therefore, the user may sometimes restate an utterance C of InDomain after an utterance A that has become OOD.

Accordingly, in order to improve user's convenience, it is desirable that it be possible to automatically learn "the fact that the utterance A and the utterance C are utterances having the same intention". At this time, if it is not determined with high accuracy whether or not the utterance C that has become InDomain is "restatement for the utterance A", then quality of learning will be degraded. Therefore, it is desirable that it be possible to determine this with high accuracy.

Further, it is not desirable that a result of learning a meaning corresponding to the utterance A be uniformly reflected to all users. For example, it is desirable that the result of the learning be reflected only when a context is the same as a context of the time when the utterance A is performed.

Accordingly, the server 10 according to the present embodiment has been created with the above circumstances in mind. Based on a determination result as to whether or not a second speech collected at second timing after first timing is a restatement of a first speech collected at the first timing, the server 10 according to the present embodiment learns a meaning corresponding to a speech recognition result of the first speech. Therefore, the meaning corresponding to the speech recognition result of the first speech can be learned appropriately.

Here, the first speech and the second speech may be speeches uttered by the same person or speeches uttered by different persons. Further, the first speech is not limited to the utterance, and may be an utterance irrelevant to a grammatical rule of a natural language (for example, a sound generated by a person with a speech disorder, and the like). Moreover, the first speech is not limited to a human speech, and may be a cry of an animal (for example, such as a bird) other than a human. Further, the second speech may be an utterance (in accordance with a grammatical rule of a standard natural language). Hereinafter, a description will be made mainly of an example in which the first speech and the second speech are utterances.

2. Detailed Description of Embodiment

2-1. Configuration

Figure 3:
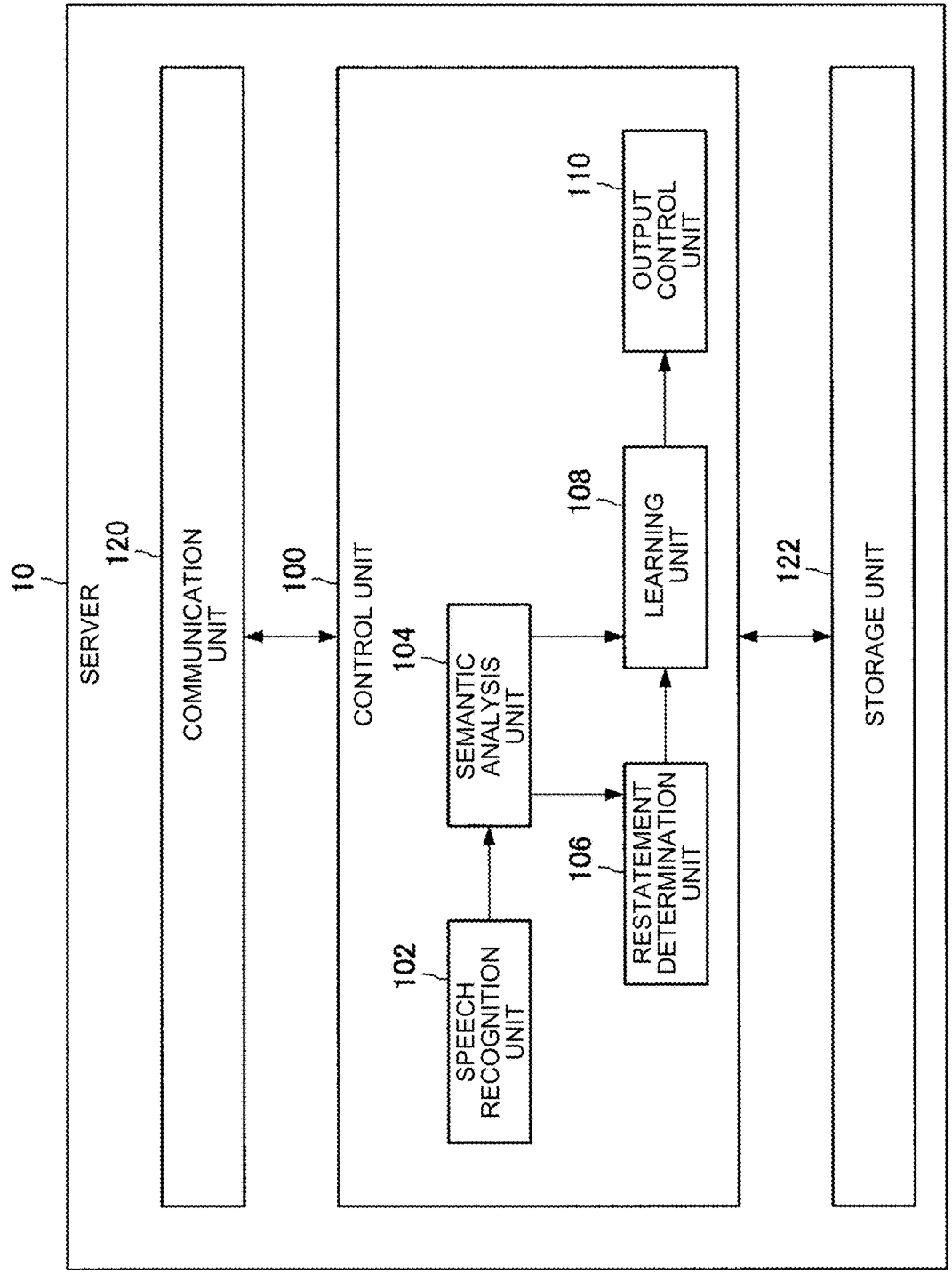
FIG. 3 is a block diagram illustrating a functional configuration example of a server 10 according to the present embodiment.

Next, a configuration according to the present embodiment will be described. FIG. 3 is a block diagram illustrating a functional configuration example of the server 10 according to the present embodiment. As illustrated in FIG. 3, the server 10 includes a control unit 100, a communication unit 120, and a storage unit 122.

{2-1-1. Control Unit 100}

For example, the control unit 100 can be configured to include a processing circuit such as a CPU 150 and a GPU, which will be described later. The control unit 100 controls operations of the server 10 as a whole. Further, as illustrated in FIG. 3, the control unit 100 includes a speech recognition unit 102, a semantic analysis unit 104, a restatement determination unit 106, a learning unit 108, and an output control unit 110.

{2-1-2. Speech Recognition Unit 102}

The speech recognition unit 102 performs speech recognition, for example, on a speech in speech data received from the terminal 20. For example, the speech recognition unit 102 performs the speech recognition on the speech, thereby converting the speech into a character string.

{2-1-3. Semantic Analysis Unit 104}

The semantic analysis unit 104 performs natural language processing on a result of the recognition performed by the speech recognition unit 102, thereby analyzing a meaning of the speech.

{2-1-4. Restatement Determination Unit 106}

The restatement determination unit 106 is an example of a determination unit according to the present disclosure. Based on a predetermined criterion, the restatement determination unit 106 determines whether or not a second utterance collected at second timing after first timing is a restatement of a first utterance collected at the first timing. For example, when a time between the first timing and the second timing remains within a predetermined threshold, the restatement determination unit 106 determines that the second utterance is a restatement of the first utterance. Further, when the time between the first timing and the second timing is more than the predetermined threshold, the restatement determination unit 106 determines that the second utterance is not a restatement of the first utterance.

Alternatively, the restatement determination unit 106 is also capable of determining whether or not the second utterance is a restatement of the first utterance based on a result of the semantic analysis of the second utterance by the semantic analysis unit 104. For example, when the second utterance is analyzed as "an utterance of intention (or meaning) to teach" such as "it stands for ' . . . '" or "it means ' . . . '", then the restatement determination unit 106 determines that the second utterance is a restatement of the first utterance.

Alternatively, based on a combination of the analysis result of the second utterance and a result of a behavior recognition of a speaker of the second utterance at the second timing, the restatement determination unit 106 may determine whether or not the second utterance is a restatement of the first utterance. For example, when the second utterance is analyzed as "an utterance of intention (or meaning) to teach", and when it is recognized that the speaker of the second utterance turns the eyes on or points at a speaker of the first utterance at the second timing, then the restatement determination unit 106 determines that the second utterance is a restatement of the first utterance.

{2-1-5. Learning Unit 108}

(2-1-5-1. Determination as to Whether or not to Learn)

The learning unit 108 learns the meaning corresponding to the speech recognition result of the first utterance based on the determination result by the restatement determination unit 106. For example, when it is determined that the second utterance is not a restatement of the first utterance, the learning unit 108 does not learn the meaning corresponding to the speech recognition result of the first utterance. Further, when it is determined that the second utterance is a restatement of the first utterance, then based on the meaning corresponding to the speech recognition result of the second utterance, the learning unit 108 learns the meaning corresponding to the speech recognition result of the first utterance. For example, when it is determined that the second utterance is a restatement of the first utterance, it is impossible to specify the meaning corresponding to the speech recognition result of the first utterance, and it is possible to specify the meaning corresponding to the speech recognition result of the second utterance, then the learning unit 108 learns the meaning corresponding to the speech recognition result of the first utterance based on the meaning corresponding to the speech recognition result of the second utterance. That is, when the first utterance is OOD, and the second utterance is InDomain, then based on the meaning corresponding to the speech recognition result of the second utterance, the learning unit 108 learns the meaning corresponding to the speech recognition result of the first utterance. In this case, for example, the learning unit 108 learns the meaning corresponding to the speech recognition result of the first utterance so that the meaning corresponding to the speech recognition result of the first utterance becomes the same as or similar to the meaning corresponding to the speech recognition result of the second utterance.

Determination Example 1: Relationship Between Contexts

Hereinafter, an example in which the learning unit 108 determines whether or not to learn will be described in more detail. For example, the learning unit 108 further determines whether or not to learn the meaning corresponding to the speech recognition result of the first utterance based on a relationship between a context at the first timing and a context at the second timing. As an example, when it is determined that a predetermined evaluation value regarding a difference between the context at the first timing and the context at the second timing satisfies a predetermined condition (for example, when it is determined that the context at the first timing and the context at the second timing greatly differ from each other), the learning unit 108 determines not to learn the meaning corresponding to the speech recognition result of the first utterance. Further, when it is determined that the predetermined evaluation value regarding the difference between the context at the first timing and the context at the second timing does not satisfy the predetermined condition (for example, when it is determined that the context at the first timing and the context at the second timing are substantially the same), the learning unit 108 determines to learn the meaning corresponding to the speech recognition result of the first utterance based on the meaning corresponding to the speech recognition result of the second utterance.

Here, the predetermined evaluation value regarding such a context difference may be a value indicating a difference in non-verbal information (for example, volume and intonation) voice. In this case, the learning unit 108 may determine whether or not to learn the meaning corresponding to the speech recognition result of the first utterance based on a difference in non-verbal information of voice between the first utterance and the second utterance.

Alternatively, the predetermined evaluation value regarding the difference between the contexts may be a value indicating a difference in non-verbal information other than voice, for example, such as a gesture. In this case, the learning unit 108 may determine whether or not to learn the meaning corresponding to the speech recognition result of the first utterance based on a value indicating a difference between non-verbal information other than voice at the first timing and non-verbal information other than voice at the second timing. For example, when a negative movement such as shaking the head is detected at the second timing, the learning unit 108 may determine that the context hardly changes between the first timing and the second timing, and may determine to learn the meaning corresponding to the speech recognition result of the first utterance. Alternatively, when it is detected that a fixation point of the speaker of the first utterance has changed by a predetermined threshold or more between the first timing and the second timing, the learning unit 108 may determine that the context has greatly changed between the first timing and the second timing, and may determine not to learn the meaning corresponding to the speech recognition result of the first utterance.

Determination Example 2: Information Regarding Speaker

Alternatively, the learning unit 108 may further determine whether or not to learn the meaning corresponding to the speech recognition result of the first utterance based on a result of speaker recognition of the second utterance. For example, the learning unit 108 may determine whether or not to learn the meaning corresponding to the speech recognition result of the first utterance based on whether or not a success frequency of past restatements of the speaker of the second utterance is equal to or more than a predetermined threshold. Thus, for example, utterances by a person who speaks without reading the situation can be excluded from objects to be learned (in other words, eliminated as noise). Further, the learning unit 108 may determine whether or not to learn the meaning corresponding to the speech recognition result of the first utterance based on whether or not a frequency of use of speech input by the speaker of the second utterance is equal to or more than a predetermined threshold. Alternatively, the learning unit 108 determines whether or not the speaker of the second utterance is lying based on biological information sensed from the speaker of the second utterance, and may thereby determine whether or not to learn the meaning corresponding to the speech recognition result of the first utterance. According to this method, for example, mischievous utterances by children can be excluded from the objects to be learned.

Figure 4:
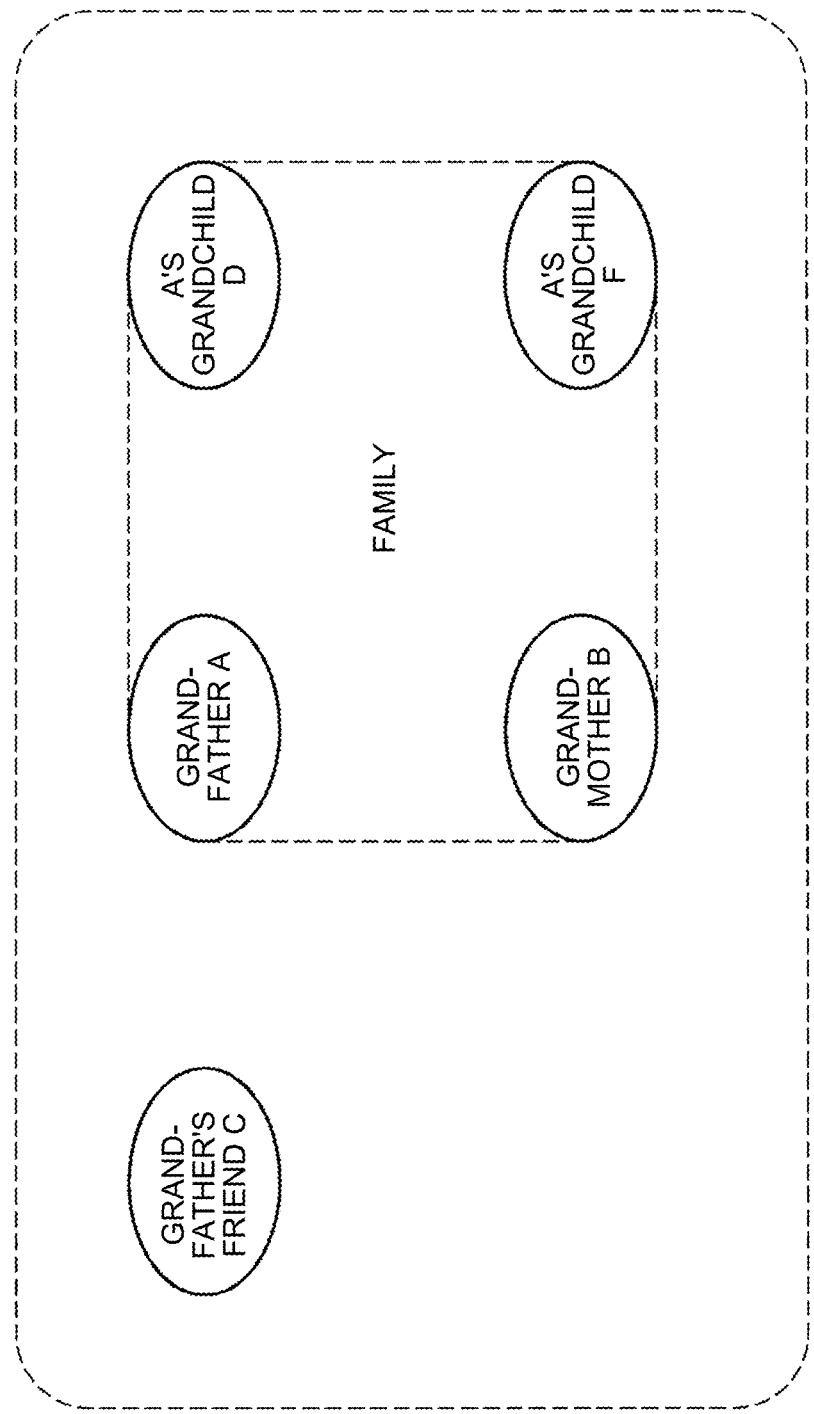
FIG. 4 is a diagram illustrating an example of a relationship between users.
Figure 5:
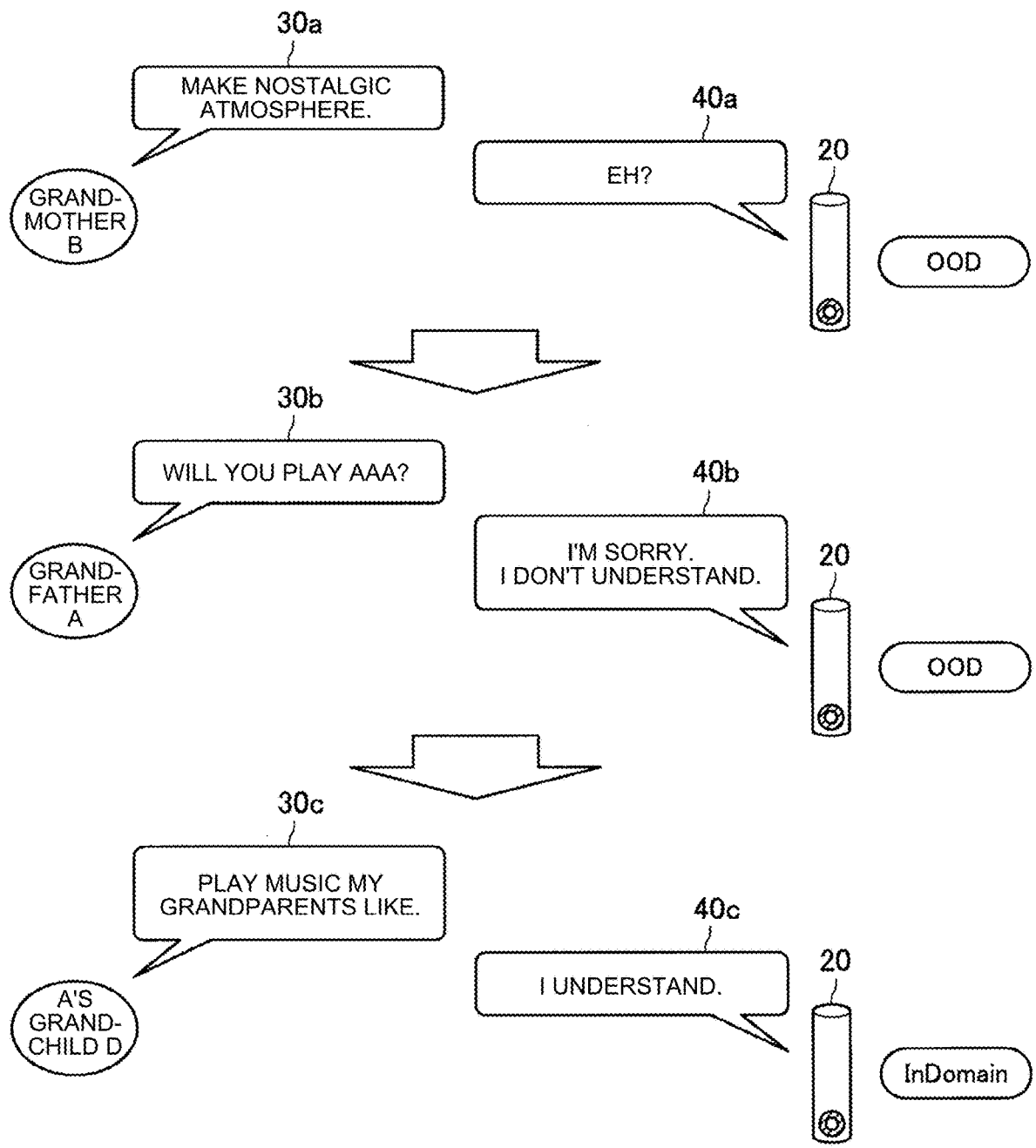
FIG. 5 is a diagram illustrating an example of utterances on the terminal 20 by a plurality of the users.

Here, the above contents will be described in more detail with reference to FIGS. 4 to 6. As illustrated in FIG. 4, here, it is assumed that a grandfather "A", a grandmother "B", a grandchild "D" of "A", and a grandchild "F" of "A" are a family. As illustrated in FIG. 5, it is assumed to be determined that, first, the grandmother "B" makes an utterance 30a "make a nostalgic atmosphere." to the terminal 20, the terminal 20 transmits speech data of the utterance 30a to the server 10, and the server 10 determines that the utterance 30a is OOD. At this time, the server 10 may cause the terminal 20 to output a speech 40a (for example, "I do not understand." or "Eh?") indicating that the utterance 30a is determined to be the OOD.

It is assumed that, thereafter, the grandfather "A" makes an utterance 30b "will you play AAA?" as a restatement of the utterance 30a to the terminal 20, the terminal 20 transmits speech data of the utterance 30b to the server 10, and the server 10 determines that the utterance 30b is also OOD. It is assumed that, thereafter, the grandchild "D" makes an utterance 30c "play music my grandparents like." as a restatement of the utterance 30a to the terminal 20, the terminal 20 transmits speech data of the utterance 30c to the server 10, and the server 10 determines that the utterance 30c is InDomain. Here, it is assumed that a success frequency of past restatements of the grandchild "D" is equal to or more than a predetermined threshold. Therefore, the learning unit 108 may determine to learn a meaning corresponding to the utterance 30a. Further, the learning unit 108 may learn the meaning corresponding to the utterance 30a so that the meaning corresponding to the utterance 30a is the same as a meaning corresponding to the utterance 30c.

Figure 6:
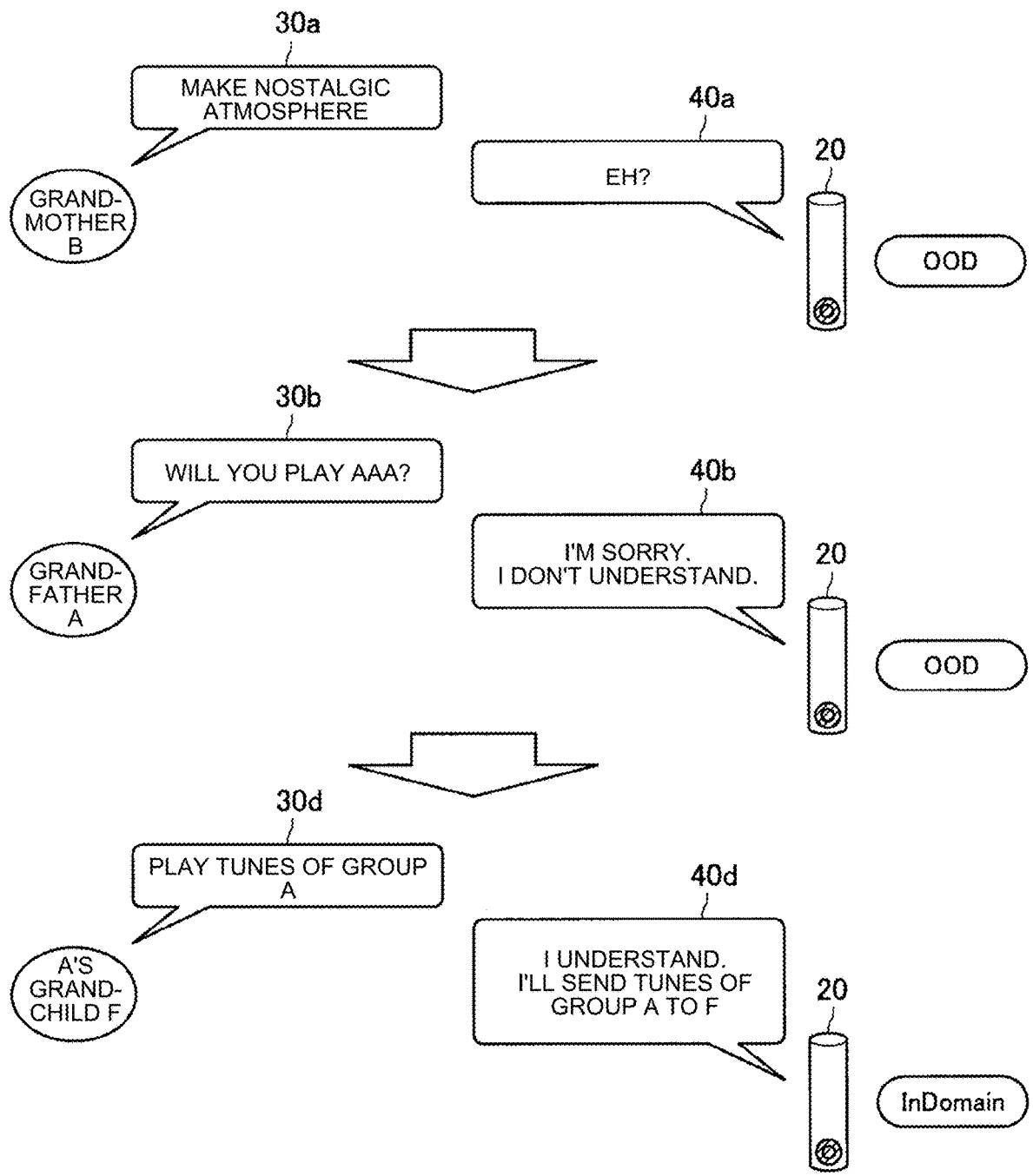
FIG. 6 is a diagram illustrating an example of utterances on the terminal 20 by the plurality of users.

FIG. 6 is a diagram illustrating an example of a situation different from the example illustrated in FIG. 5. As illustrated in FIG. 6, as in the example illustrated in FIG. 5, it is assumed that, first, the grandmother "B" makes the utterance 30a, and thereafter, the grandfather "A" makes the utterance 30b. Thereafter, unlike the example illustrated in FIG. 5, it is assumed that the grandchild "F" makes a mischievous utterance 30d "play tunes of group A" to the terminal 20, the terminal 20 transmits speech data of the utterance 30d to the server 10, and the server 10 determines that the utterance 30d is InDomain. Here, it is assumed that a success frequency of past restatements of the grandchild "F" is less than the predetermined threshold. Therefore, the learning unit 108 may determine not to learn a meaning corresponding to the utterance 30a. In this case, as illustrated in FIG. 6, the control unit 100 may transfer "tunes of group A" to a predetermined terminal (such as a smartphone) owned by "F". Further, the output control unit 110 to be described later causes the terminal 20 to output a speech 40d issuing a notice that the meaning corresponding to the utterance 30a has not been learned (in other words, that the "tunes of group A" has been transferred).

(2-1-5-2. Determination of Application Range of Learning Result)

First Determination Example: Accustomedness to Speech Input

Further, when having learned the meaning corresponding to the speech recognition result of the first utterance, the learning unit 108 is capable of determining, based on a predetermined criterion, one or more users (hereinafter, sometimes referred to as "applied user of learning result") in each of which a meaning of substantially the same utterance as the first utterance is determined to be the same as the learning result of the meaning corresponding to the speech recognition result of the first utterance when substantially the same utterance as the first utterance is made. For example, the learning unit 108 may determine the applied user of the learning result based on a determination result as to whether or not the speaker of the second utterance is accustomed to speech input. As an example, when it is determined that the speaker of the second utterance is accustomed to the speech input, the learning unit 108 may determine the applied user of the learning result to be all members. Further, when it is determined that the speaker of the second utterance is not accustomed to the speech input, the learning unit 108 may determine the applied user of the learning result to be only the speaker of the second utterance.

Here, whether or not the user is accustomed to the speech input may be determined based on, for example, a frequency of use of the speech input by the user, reliability of a speech recognition result of an utterance of the user, or the presence or absence of speech hesitation or a filler in the utterance of the user. Alternatively, whether or not the user is accustomed to the speech input may be determined based on the presence or absence of confidence the user, which is determined based on biological information of the user or an analysis result of an expression of the user. Alternatively, whether or not the user is accustomed to the speech input may be determined based on a combination of two or more of these indices. Thus, the accuracy of the determination can be improved. For example, when it is determined that reliability of a speech recognition result of an utterance of a certain user is high and there is no speech hesitation, it may be determined that the user is accustomed to the speech input.

Second Determination Example: Range which Speech Reaches

Alternatively, the learning unit 108 may determine, as such applied users of the learning result, those who have been determined to be present within a range which the speech of the second utterance physically reaches. According to this method, those who have not been present around when the second utterance has been made can be excluded as non-application object users of the learning result. This can prevent an unintended speech recognition result from being obtained when those who have not been present around use the speech input. Here, the range which the speech reaches may be determined, for example, by combining position information of the speaker and an image recognition result based on a captured image around the speaker at the second timing. Alternatively, the range which the speech reaches may be determined based on a measurement result of a distance from the speaker using, for example, a radar. Alternatively, for example, based on the registered content of a schedule of the speaker of the second utterance at the second timing, a location where the speaker should be located is specified, whereby the range which the speech reaches may be determined.

Third Determination Example: Community of Speaker

Alternatively, the learning unit 108 may determine one or more users, who belong to the same community as the speaker of the second utterance, as such applied users of the learning result, the one or more users being specified, for example, from demographic information of the speaker of the second utterance. Here, examples of the community include a family, a community of game associates, a chat group, and friends. For example, when the speaker of the second utterance is "grandchild", the learning unit 108 may determine the applied users of the learning result to be a family of the speaker of the second utterance.

Fourth Determination Example: Community of Topic of Utterance

Alternatively, the learning unit 108 may determine one or more users, who belong to a community matching with a topic of the first utterance or the second utterance, as the applied users of the learning result. For example, when the first utterance is "play nostalgic music", the learning unit 108 may determine that the topic of the first utterance is "music", and may determine one or more users, who belong to a "music" community as the applied users of the learning result. Alternatively, when the second utterance is an utterance including a phrase peculiar to a certain game, the learning unit 108 may determine one or more users, who belong to a "game" community as the applied users of the learning result.

Fifth Determination Example: Utterance Desired to be Personalized

Alternatively, when it is detected that the second utterance is an utterance desired to be personalized, the learning unit 108 may determine the applied user of the learning result to be only the speaker of the second utterance. A specific example of such a case includes a case where the first utterance is an utterance corresponding to a secret password, and the second utterance is a restatement of the first utterance (in other words, a case where other users are not desired to memorize the utterance). Here, an example of a method of detecting that the utterance is an utterance desired to be personalized includes: detecting whether or not the speaker of the second utterance has made the utterance using a microphone; detecting whether or not the second utterance has been made by a whisper; detecting whether or not the speaker of the second utterance has performed a gesture of covering the mouth at the time of the second utterance, or the like. Note that it is possible to detect whether or not the second utterance is a whisper by, for example, non-audible tweet recognition or lip recognition.

Specific Example

Here, the above functions of the learning unit 108 will be described in more detail with reference to FIG. 5. In the example illustrated in FIG. 5, it is assumed that the frequency of use of the speech input by the grandchild "D" is equal to or more than a predetermined threshold. Therefore, the learning unit 108 may determine applied users of a learning result of the meaning corresponding to the utterance 30a as all users (that is, "A", "B", "C", "D", and "F") present at that place. Alternatively, the learning unit 108 may determine the applied users of the learning result to be only the family of "D".

{2-1-6. Output Control Unit 110}
(2-1-6-1. Notification of Learning Completed)

First Notification Example

The output control unit 110 controls output of information (for example, a video, a sound and the like) from the terminal 20. For example, when the learning unit 108 has learned the meaning corresponding to the speech recognition result of the first utterance, the output control unit 110 causes the terminal 20 to output a notification speech (for example, text to speech (TTS) or the like) indicating that the meaning corresponding to the speech recognition result of the first utterance has already been learned.

Figure 7:
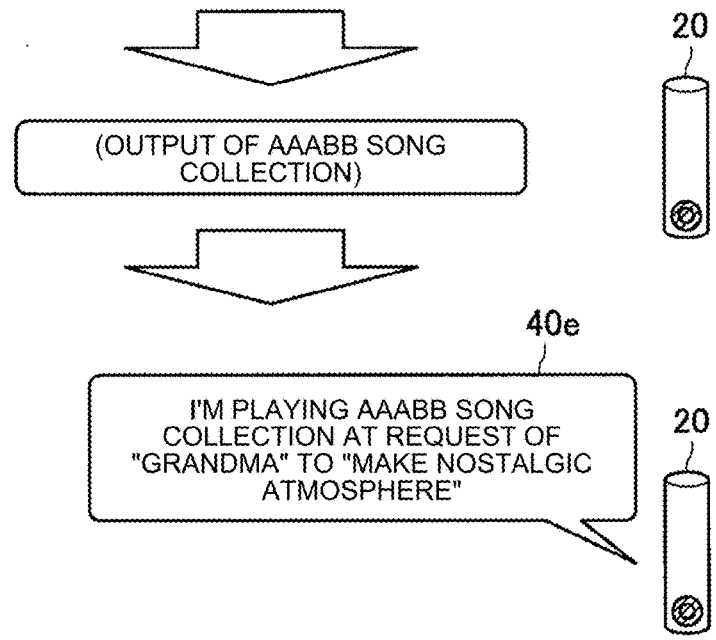
FIG. 7 is a diagram illustrating an example of processing executed by the terminal 20 after a situation illustrated in FIG. 5.

Here, the above function will be described in more detail with reference to FIG. 7. FIG. 7 is a diagram illustrating an example of controlling the output of the terminal 20 in the example illustrated in FIG. 5. FIG. 7 illustrates a situation immediately after the learning unit 108 determines to learn the meaning corresponding to the utterance 30c. As illustrated in FIG. 7, first, the output control unit 110 causes the terminal 20 to start outputting "AAABB song collection" based on an analysis result of the meaning corresponding to the utterance 30c. Further, the output control unit 110 causes the terminal 20 to output a notification speech 40e indicating that the meaning corresponding to the utterance 30a has been learned, for example, such as "the AAABB song collection is being played at a request of 'grandma' to 'make a nostalgic atmosphere'", and indicating a learned content.

Second Notification Example

When the learning unit 108 has learned that a meaning corresponding to a certain utterance is the same as a meaning corresponding to each of a plurality of other utterances, the output control unit 110 is also capable of causing the terminal 20 to output a speech issuing a notice on a result of this learning. For example, the output control unit 110 first selects, for example, any one of the plurality of other utterances as an utterance on which a notice is to be issued. Next, the output control unit 110 determines a user to be notified. Then, the output control unit 110 causes the terminal 20 to output, to the user to be notified, a speech issuing a notice that it has already been learned that a meaning corresponding to the utterance on which a notice is to be issued and a meaning corresponding to the certain utterance are the same. For example, the output control unit 110 first causes the terminal 20 to output a content of the certain utterance using a first TTS, and causes the terminal 20 to output, using a second TTS, a content of the utterance on which a notice is to be issued. As an example, it is assumed that the certain utterance is "play BGM" and that the content of the utterance on which a notice is to be issued is "instructing to reproduce song of group A". In this case, for example, the output control unit 110 may cause the terminal 20 to output a speech "play BGM" using the first TTS, and immediately thereafter, may cause the terminal 20 to output a speech "song X of group A will be delivered at a request of . . . " using the second TTS.

Note that the output control unit 110 may cause the terminal 20 to output this notification speech only at specific timing. For example, only when a volume of an output of "song X" by the terminal 20 is equal to or less than a predetermined threshold, the output control unit 110 may cause the terminal 20 to output this notification speech. Alternatively, when a volume of noise around the terminal 20 becomes equal to or lower than a predetermined threshold, the output control unit 110 may cause the terminal 20 to output this notification speech.

Next, an example of selecting the utterance on which a notice (regarding this notification speech) is to be issued will be described in more detail. For example, the output control unit 110 may select, as the utterance on which a notice is to be issued, an utterance having the highest reliability of natural language understanding from among the plurality of other utterances, or may select an utterance made first therefrom, or may select an utterance made last. Alternatively, the output control unit 110 may select, as the utterance on which a notice is to be issued, an utterance in which a degree of behavior (magnitude, frequency or the like of the behavior) of the speaker recognized at the time of the utterance is the largest. Alternatively, for each of the plurality of other speeches, the output control unit 110 may determine a degree of excitement at the time of the utterance based on vital information at the time of the utterance or non-verbal information of the voice, and may select an utterance, in which the degree of excitement at the time of the utterance is the largest, as the utterance on which a notice is to be issued.

Hereinafter, an example of determining the above user to be notified will be described in more detail. For example, the output control unit 110 may determine all users located around the terminal 20 as such user to be notified. Alternatively, the output control unit 110 may determine a person whose degree of current busyness (for example, frequency of behavior) is the smallest as the user to be notified. Alternatively, the output control unit 110 may determine, as the user to be notified, one or more users in a "listening state" within a sensing range of the terminal 20. Whether or not each user is in the listening state is detectable based on, for example, whether or not a frequency of blinking of the user is low.

(2-1-6-2. Output Control Based on Learning Result)

When the learning unit 108 has learned the meaning corresponding to the speech recognition result of the first utterance, the output control unit 110 is capable of controlling the terminal 20 regarding the output of information based on a result of the learning.

Figure 8:
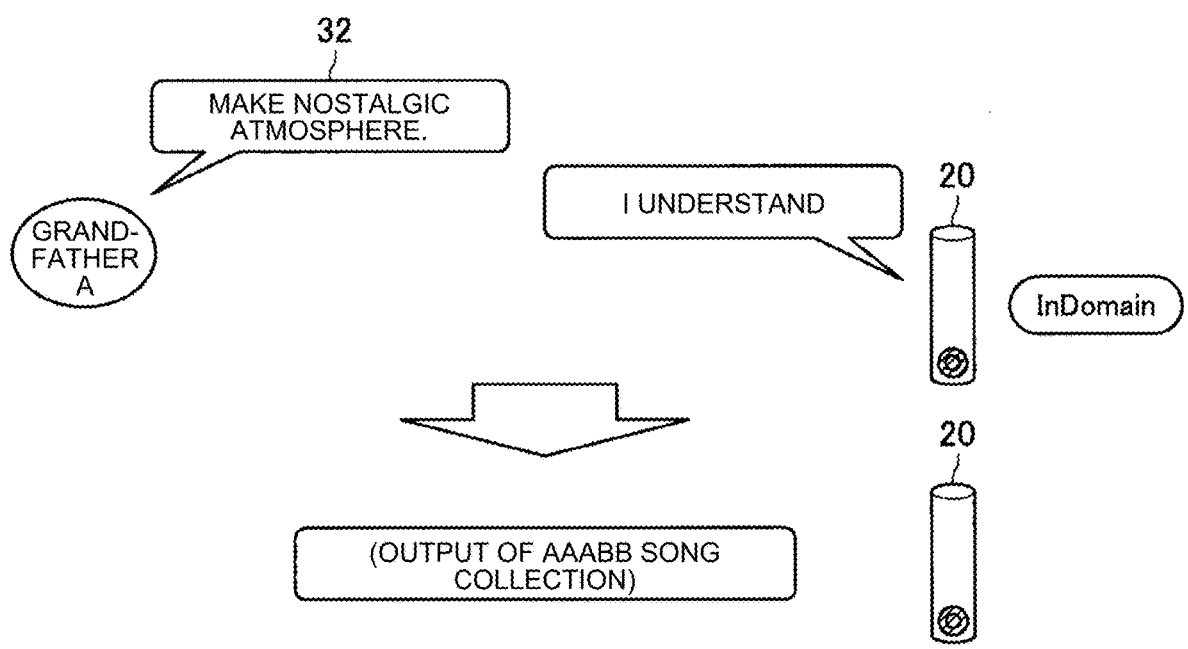
FIG. 8 is a diagram illustrating an example of processing executed by the terminal 20 in a case where an utterance is collected after the situation illustrated in FIG. 5.

FIG. 8 is a diagram illustrating an example of controlling the terminal 20 regarding the output after the learning by the learning unit 108 is performed in the example illustrated in FIG. 5. As illustrated in FIG. 8, it is assumed that the grandfather "A" has made, to the terminal 20, the same utterance 32 as the utterance 30*a* illustrated in FIG. 5, and that the terminal 20 has transmitted speech data of the utterance 32 to the server 10. In this case, first, based on such a learning result by the learning unit 108, the semantic analysis unit 104 of the server 10 analyzes that a meaning corresponding to the utterance 32 is "instructing to reproduce AAABB song collection" (in other words, the same meaning as the meaning corresponding to the utterance 30*c* illustrated in FIG. 5). Then, the output control unit 110 causes the terminal 20 to start outputting "AAABB song collection" based on a result of the analysis.

{2-1-7. Communication Unit 120}

The communication unit 120 is configurable to include a communication device 166 to be described later. The communication unit 120 transmits and receives information to and from other devices. For example, the communication unit 120 transmits various pieces of information to the terminal 20 in accordance with the control of the output control unit 110. Further, the communication unit 120 receives various sensing results from the terminal 20.

{2-1-8. Storage Unit 122}

The storage unit 122 is configurable to include a storage device 164 to be described later. The storage unit 122 stores various data and various pieces of software. For example, the storage unit 122 stores a history of such results of the learning by the learning unit 108.

2-2. Application Example

Figure 9:
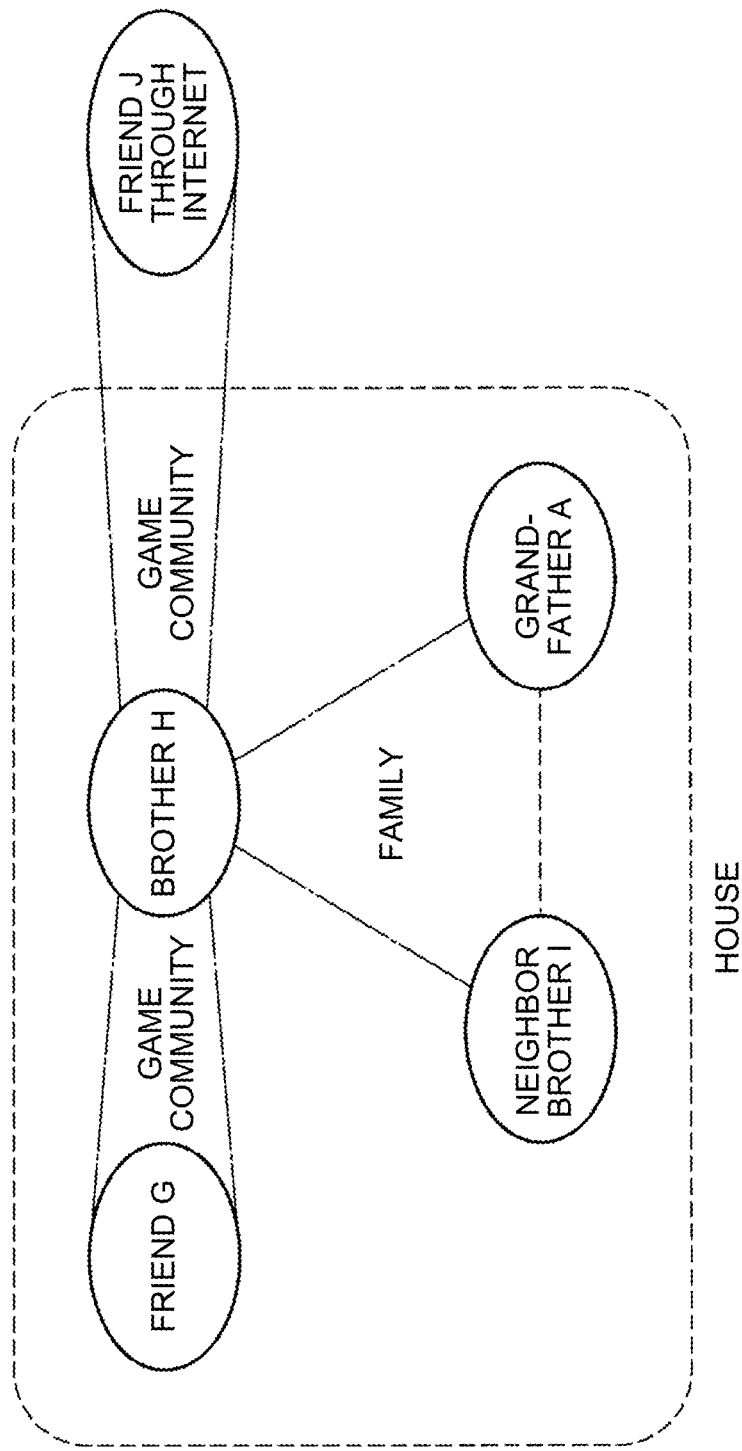
FIG. 9 is a diagram illustrating a relationship between users according to an application example of the present embodiment.
Figure 10:
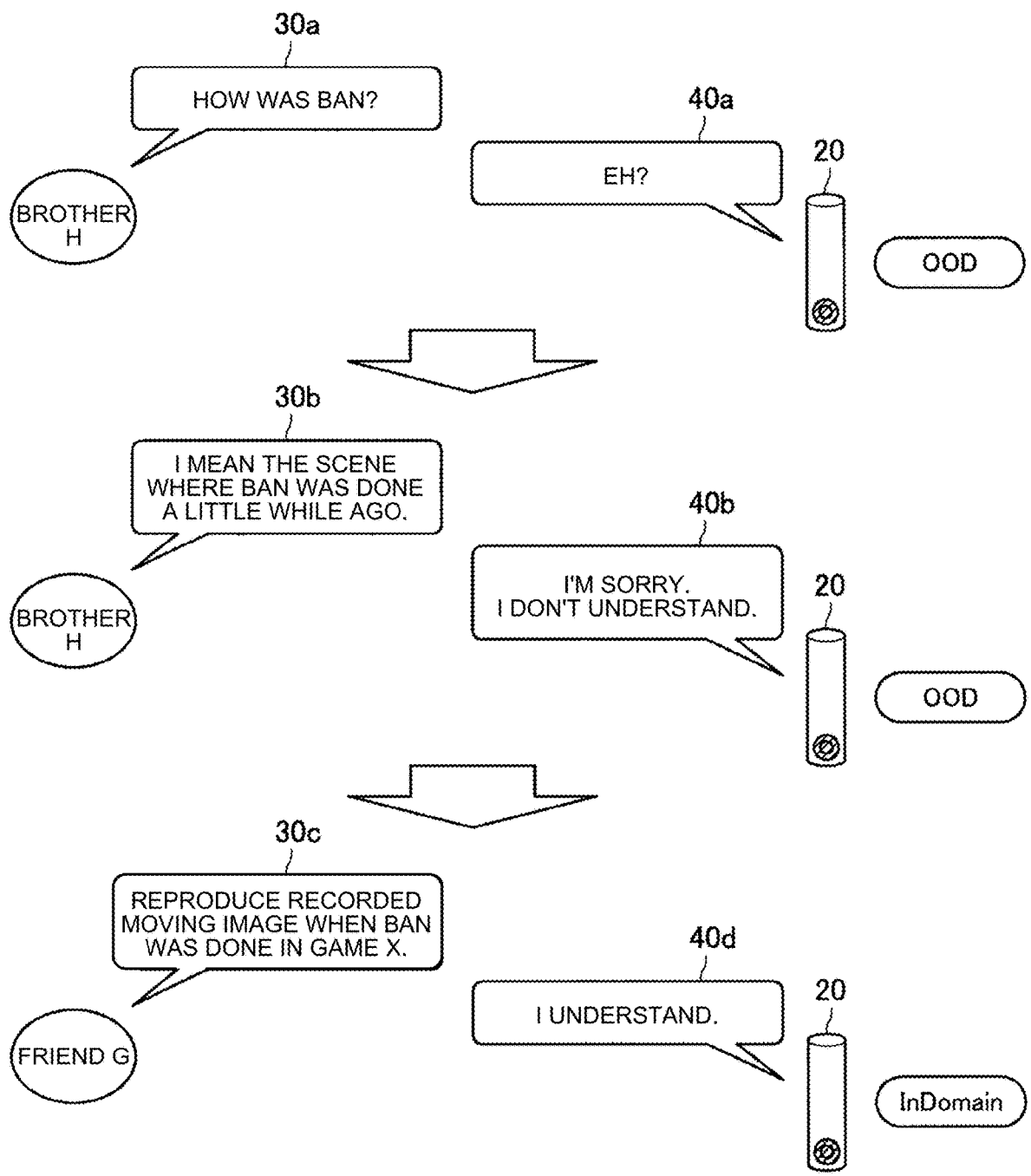
FIG. 10 is a diagram illustrating an example of utterances on the terminal 20 by a plurality of the users according to the present application example.
Figure 11:
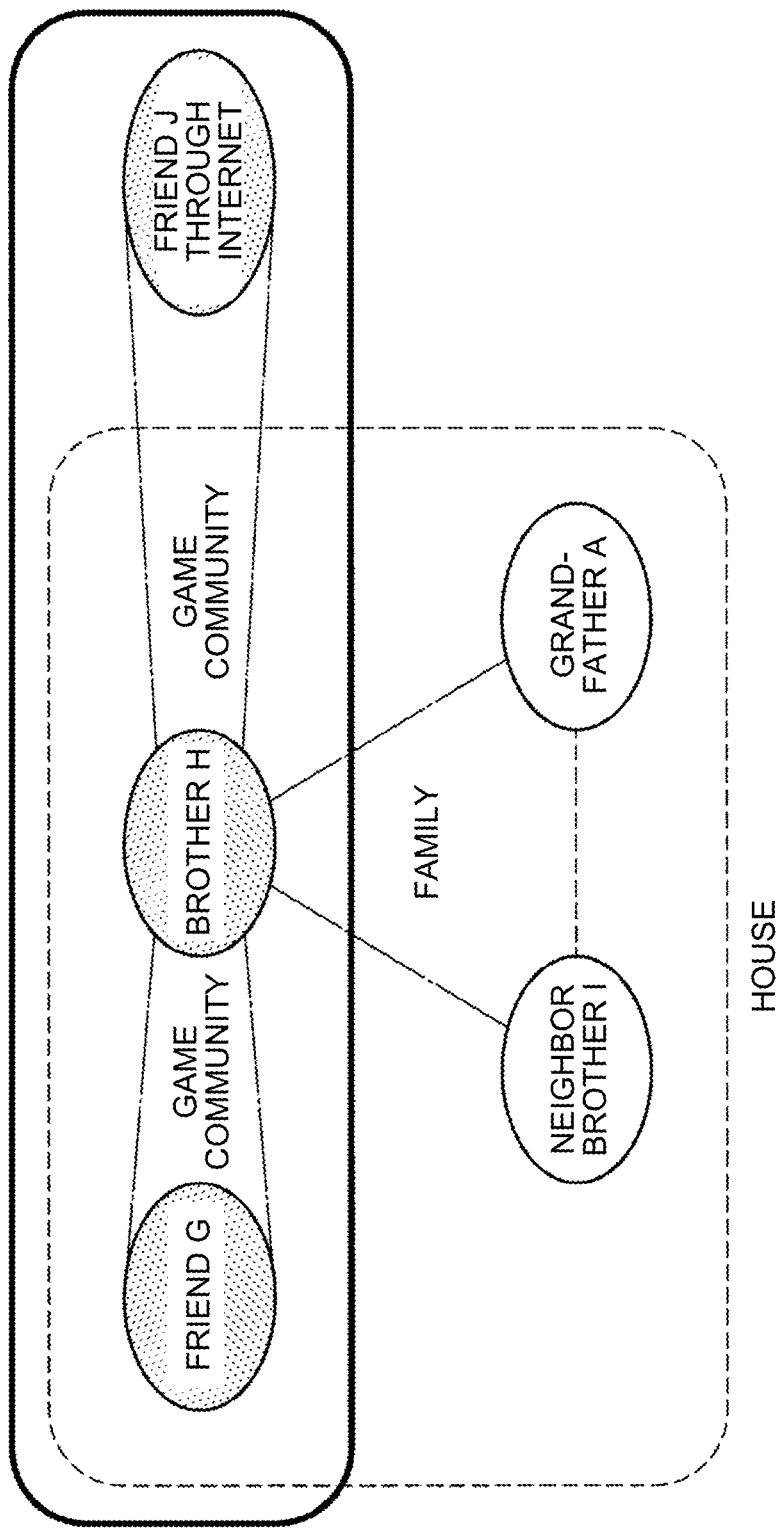
FIG. 11 is a diagram schematically illustrating applied users of the learning result and non-application object users of the learning result after a situation illustrated in FIG. 10.

The configuration of the present embodiment has been described above. Next, an application example of the present embodiment will be described with reference to FIGS. 9 to 13. In the present application example, as illustrated in FIG. 9, illustrated is an example in which a brother "H", a brother "I", and the grandfather "A" are family members, and "H", "G", and "J" belong to the same game community. In the present application example, it is assumed that, as illustrated in FIG. 10, first, "H" makes the utterance 30*a* "how was BAN?" to the terminal 20, and the terminal 20 transmits speech data of the utterance 30*a* to the server 10, and the server 10 determines that this utterance 30*a* is OOD. It is assumed that, thereafter, "H" makes the utterance 30*b* "I mean the scene where BAN was done a little while ago" as a restatement of the utterance 30*a* to the terminal 20, the terminal 20 transmits speech data of the utterance 30*b* to the server 10, and the server 10 determines that the utterance 30*b* is also OOD. It is assumed that, thereafter, "G" makes an utterance 30*c* "reproduce a recorded moving image when BAN was done in Game X" as a restatement of the utterance 30*a* to the terminal 20, the terminal 20 transmits speech data of the utterance 30*c* to the server 10, and the server 10 determines that this utterance 30*c* is InDomain. Here, it is assumed that a success frequency of past restatements of "G" is equal to or more than a predetermined threshold. Therefore, the learning unit 108 is capable of determining to learn the meaning corresponding to the utterance 30*a*, and is capable of learning the meaning corresponding to the utterance 30a so that the meaning corresponding to the utterance 30a is the same as a meaning corresponding to the utterance 30c.

Moreover, in the present application example, it is assumed that a frequency of use of the speech input by "G" is equal to or more than a predetermined threshold. Accordingly, the learning unit 108 is capable of determining applied users of the learning result corresponding to the utterance 30a (that is, the applied users are one or more users in which a meaning of an utterance is the same as the learning result of the meaning corresponding to the speech recognition result of the utterance 30a at the time when substantially the same utterance as the utterance 30a is made) to be only users (that is, "G", "H", and "J") belonging to the above game community as illustrated by a frame in FIG. 11.

Figure 12:
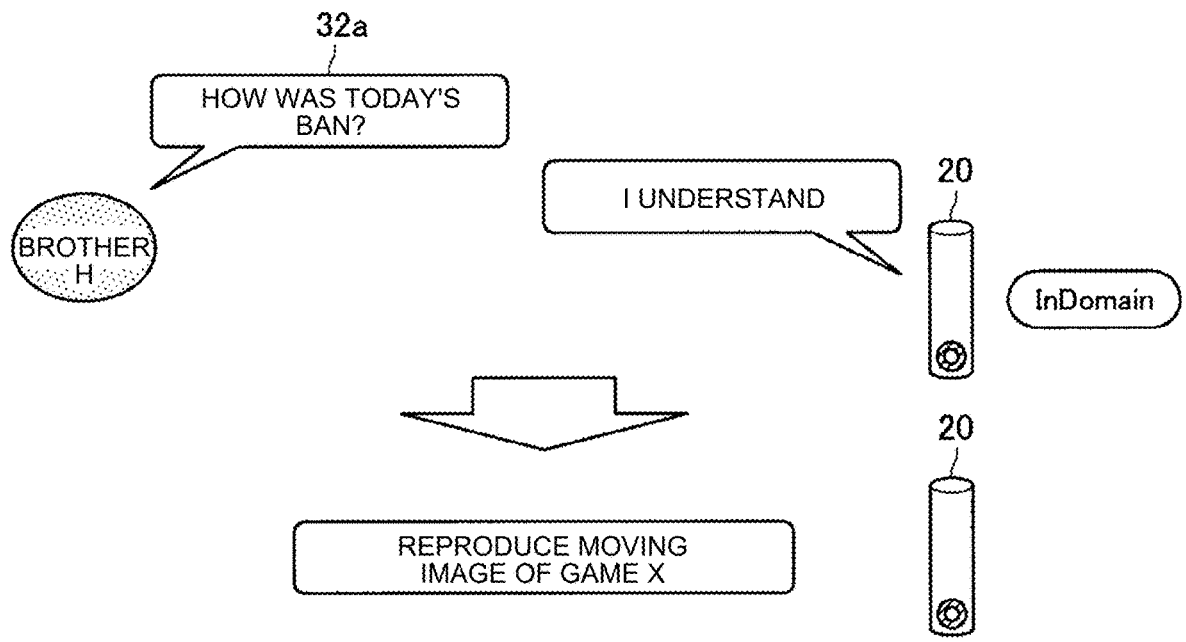
FIG. 12 is a diagram illustrating an example of processing executed by the terminal 20 in a case where an utterance is collected after the situation illustrated in FIG. 10.

It is assumed that, thereafter, as illustrated in FIG. 12, for example, a few days later, "H" has made, to the terminal 20, substantially the same utterance 32a "how was today's BAN?" as the utterance 30a illustrated in FIG. 10, and the terminal 20 has transmitted speech data of the utterance 32a to the server 10. In this case, first, the semantic analysis unit 104 of the server 10 confirms that "H" is an applied user of the learning result of the meaning corresponding to the utterance 30a. Next, based on the learning result by the learning unit 108, the semantic analysis unit 104 analyzes that a meaning corresponding to the utterance 32a is "instructing to reproduce the moving image of Game X" (in other words, the same meaning as the meaning corresponding to the utterance 30c illustrated in FIG. 10). Then, the output control unit 110 causes the terminal 20 to start outputting "moving image of Game X" based on a result of the analysis.

Figure 13:
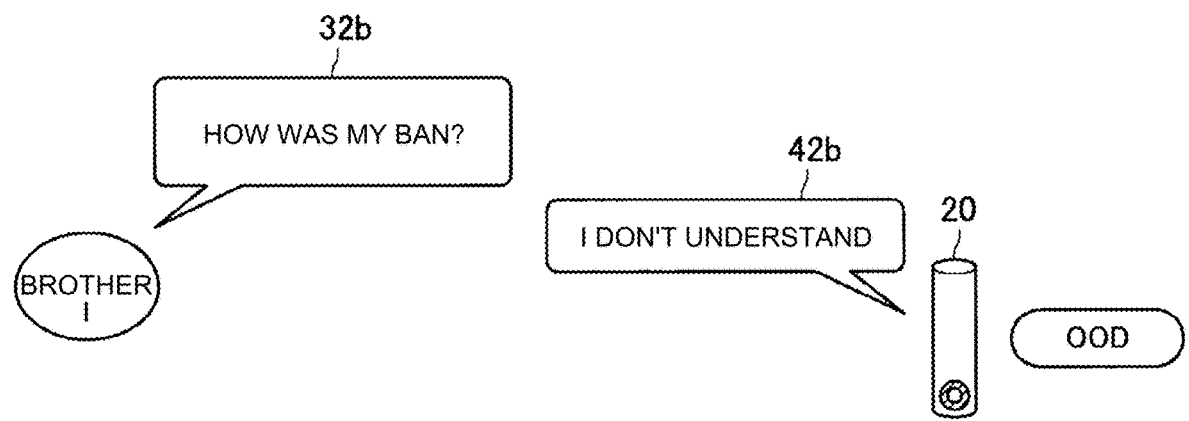
FIG. 13 is a diagram illustrating an example of processing executed by the terminal 20 in the case where the utterance is collected after the situation illustrated in FIG. 10.

It is assumed that, as illustrated in FIG. 13, for example, thereafter, "I" has made, to the terminal 20, substantially the same utterance 32b "how was my BAN" as the utterance 30a illustrated in FIG. 10, and the terminal 20 has transmitted speech data of the utterance 32b to the server 10. In this case, first, the semantic analysis unit 104 of the server 10 confirms that "I" is not the applied user of the learning result of the meaning corresponding to the utterance 30a. Next, the semantic analysis unit 104 determines not to use the learning result by the learning unit 108 in order to analyze the meaning corresponding to the utterance 32b. Then, the semantic analysis unit 104 determines that the utterance 32b is OOD. Thereafter, the output control unit 110 causes the terminal 20 to output a notification speech 42b indicating a result of the determination.

<2-3. Flow of Processing>
{2-3-1. Overall Flow of Processing}

Figure 14:
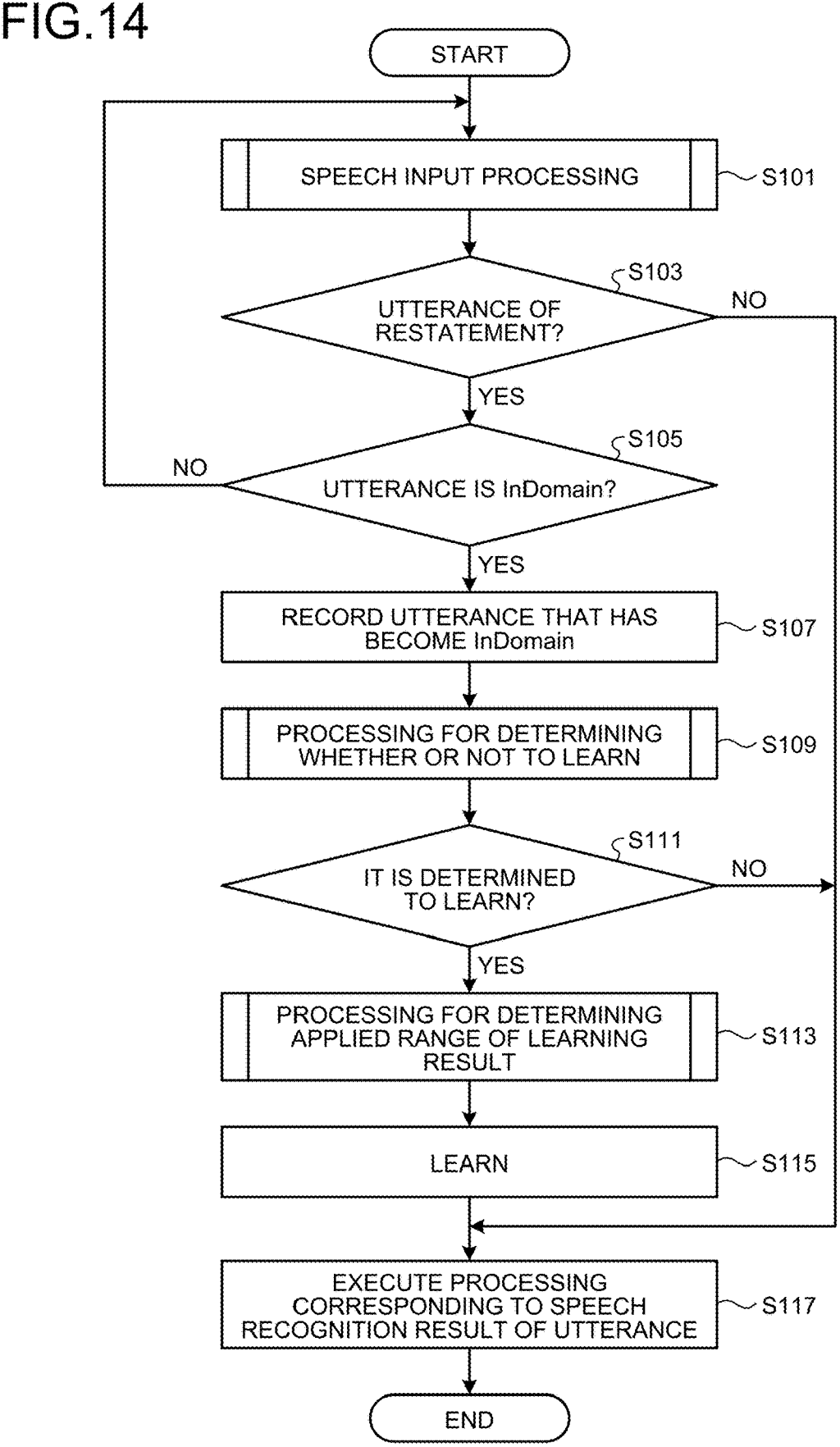
FIG. 14 is a flowchart illustrating an example of a processing flow according to the present embodiment.

The application example of the present embodiment has been described above. Next, a flow of processing according to the present embodiment will be described. FIG. 14 is a flowchart illustrating an example of the flow of the processing according to the present embodiment. As illustrated in FIG. 14, first, the server 10 performs "speech input processing" to be described later (S101).

Thereafter, the restatement determination unit 106 of the server 10 determines whether or not the latest utterance input in S101 is a restatement of an already input utterance (S103). When it is determined that the utterance is not a restatement (S103: No), the server 10 performs processing of S117 to be described later.

Meanwhile, when it is determined that the utterance is a restatement of the already input utterance (S103: Yes), then the semantic analysis unit 104 determines whether or not the utterance is InDomain (S105). When it is determined that the utterance is not InDomain (that is, is OOD) (S105: No), the server 10 performs the processing on and after S101 again.

Meanwhile, when it is determined that the utterance is InDomain (S105: Yes), the control unit 100 of the server 10 first records information (such as a speech recognition result) regarding the utterance in the storage unit 122. (S107).

Subsequently, the learning unit 108 performs "processing for determining whether or not to learn" to be described later (S109). When it is determined not to learn the utterance in S109 (S111: No), the server 10 performs the processing of S117 to be described later.

Meanwhile, when it is determined to learn the utterance in S109 (S111: Yes), the learning unit 108 performs "determination processing for applied range of learning result" to be described later (S113).

Subsequently, the learning unit 108 learns a meaning corresponding to a speech recognition result of another utterance (first utterance), which is corresponding to the second utterance and is collected before the utterance (second utterance), based on the meaning corresponding to the speech recognition result of the second utterance (S115).

Thereafter, the control unit 100 executes processing corresponding to the speech recognition result of the utterance (S117).

{2-3-2. Speech Input Processing}

Figure 15:
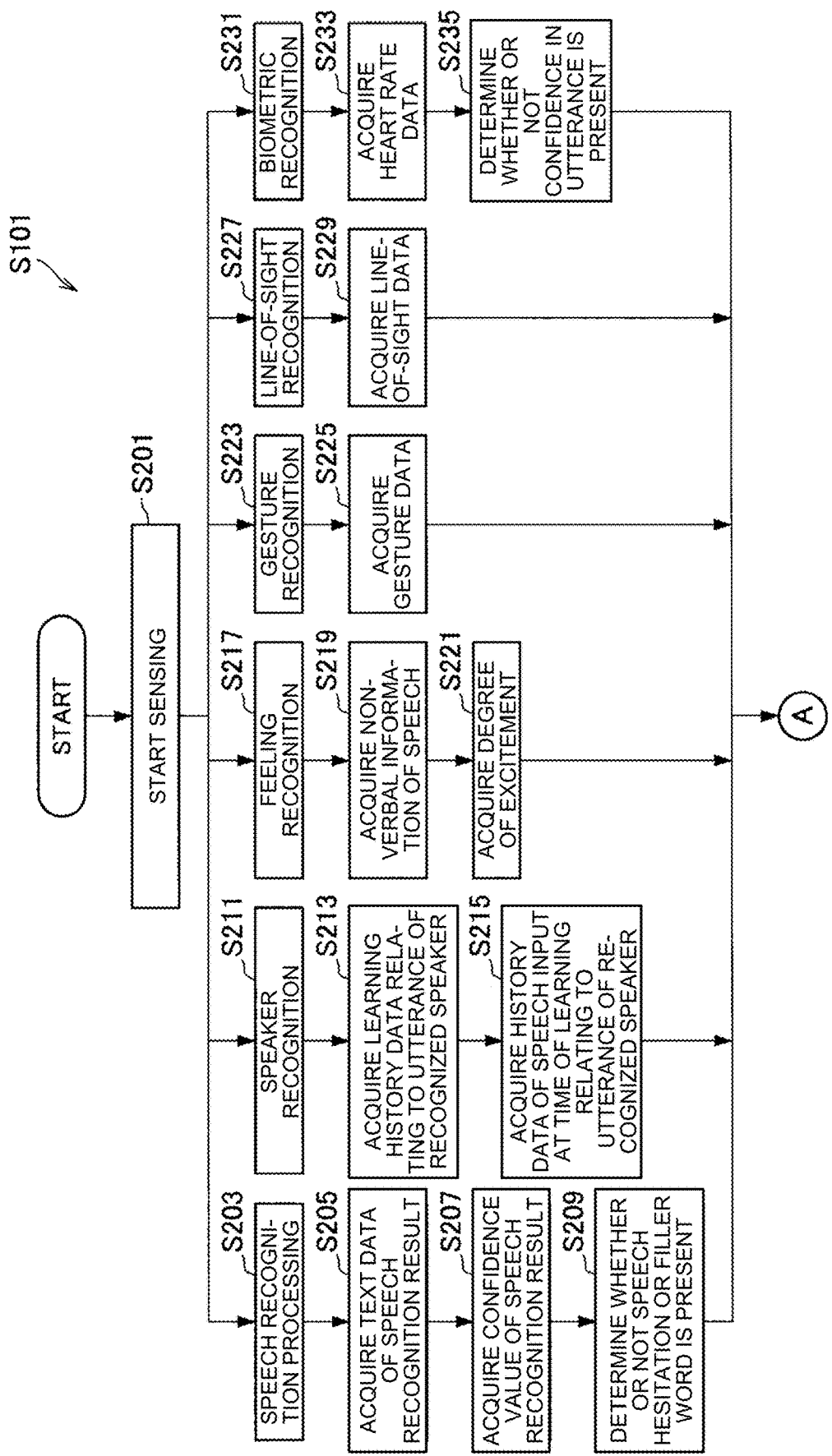
FIG. 15 is a flowchart illustrating a part of a flow of "speech input processing" according to the present embodiment.
Figure 16:
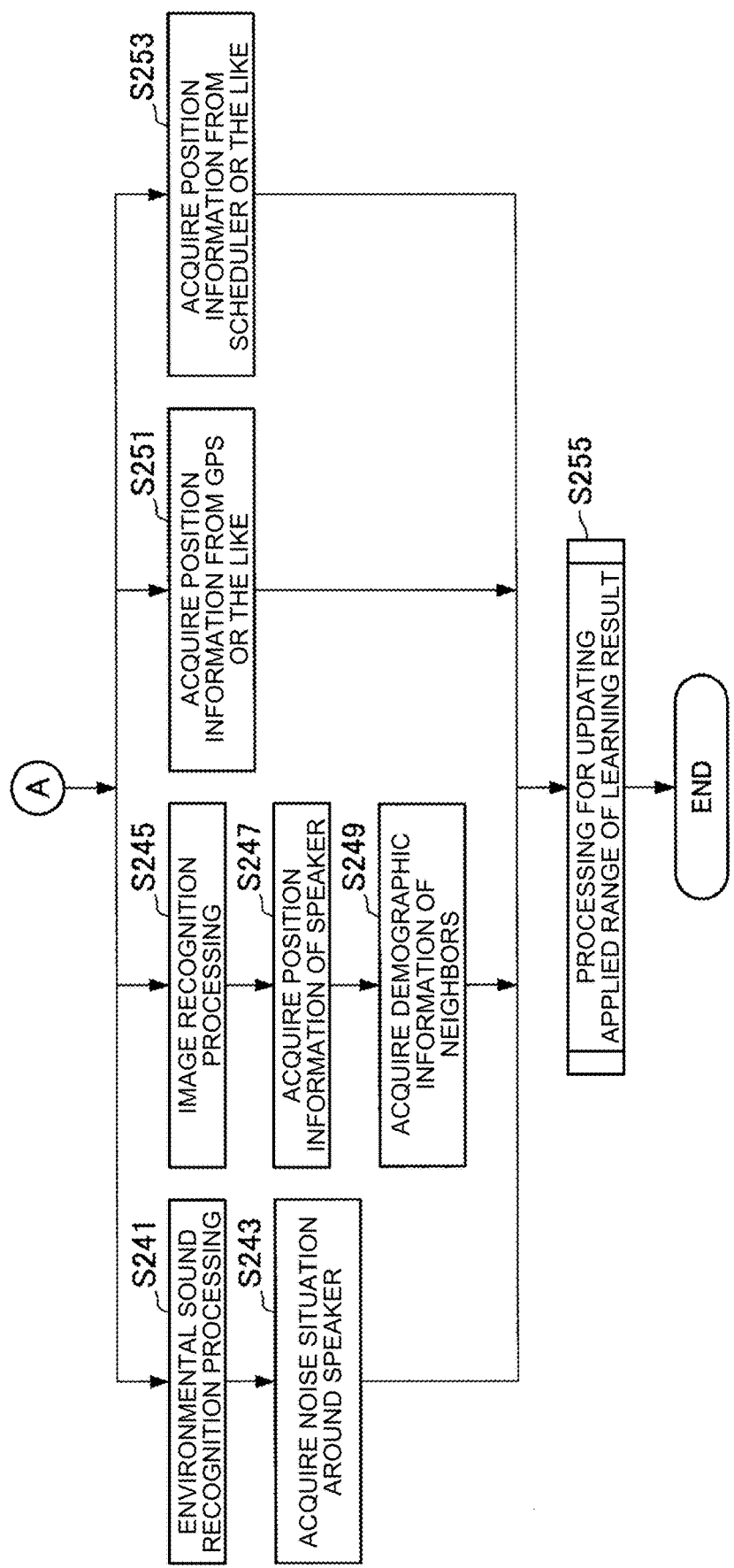
FIG. 16 is a flowchart illustrating a part of the flow of "speech input processing" according to the present embodiment.

Here, the flow of "speech input processing" in S101 will be described in more detail with reference to FIG. 15 and FIG. 16. FIG. 15 and FIG. 16 are flowcharts each illustrating a part of the flow of "speech input processing". As illustrated in FIG. 15, first, the terminal 20 starts various types of sensing, for example, such as sound collection. Then, every time various sensing results are acquired, the terminal 20 sequentially transmits the acquired individual sensing results to the server 10 (S201).

Thereafter, when the speech is collected in S201, the speech recognition unit 102 of the server 10 recognizes the speech (S203). Subsequently, the speech recognition unit 102 acquires text data corresponding to a result of the recognition in S203 (S205). Subsequently, the speech recognition unit 102 acquires a confidence value of a speech recognition result in S203 (S207). Further, the speech recognition unit 102 determines whether or not the speech contains speech hesitation or a filler word (S209). Thereafter, the server 10 performs processing of S241, S245, S251, and S253, which will be described later.

Further, when the speech is collected in S201, the control unit 100 recognizes the speaker of the speech based on, for example, a captured image captured by the terminal 20 at the time of collecting the speech (S211). Subsequently, the control unit 100 extracts, from the storage unit 122, learning history data relating to the utterance of the speaker recognized in S211 (S213). Subsequently, the control unit 100 extracts, from the storage unit 122, history data indicating a speech input content at the time of learning the utterance of the speaker recognized in S211 (S215). Thereafter, the server 10 performs the processing of S241, S245, S251, and S253, which will be described later.

Further, after S201, the control unit 100 recognizes the feeling of the speaker based on, for example, the image of the speaker captured by the terminal 20, the speech collected by the terminal 20, and the like (S217). When the speech is collected by the terminal 20, the control unit 100 further acquires non-verbal information (for example, volume, intonation and the like) of the speech by specifying the non-verbal information (S219). Subsequently, the control unit 100 specifies the degree of excitement of the speaker based on various sensing results (for example, biological information of the speaker, and the like) acquired by the terminal 20 (S221). Thereafter, the server 10 performs the processing of S241, S245, S251, and S253, which will be described later.

Further, after S201, the control unit 100 recognizes the gesture of the speaker based on, for example, the image of the speaker captured by the terminal 20 (S223), and acquires data of the recognized gesture (S225). Thereafter, the server 10 performs the processing of S241, S245, S251, and S253, which will be described later.

Further, after S201, the control unit 100 recognizes the line of sight of the speaker based on, for example, the image of the speaker captured by the terminal 20 (S227), and acquires data of the line of sight (S229). Thereafter, the server 10 performs the processing of S241, S245, S251, and S253, which will be described later.

Further, after S201, the control unit 100 performs biometric recognition on the speaker based on, for example, the biological information of the speaker acquired by the terminal 20 (S231). Then, the control unit 100 acquires the heart rate data of the speaker (S233). Further, the control unit 100 determines whether or not the speaker is confident in the utterance based on the acquired biological information (S235).

Here, a flow of processing after S235 (and S209, S215, S221, S225, S229) will be described with reference to FIG. 16. As illustrated in FIG. 16, after S235, first, the control unit 100 performs processing for recognizing an environmental sound based on the sound collection result by the terminal 20 (S241). Subsequently, the control unit 100 specifies a noise situation around the speaker based on a result of the recognition in S241 (S243). Thereafter, the control unit 100 performs "processing for updating application range of learning result" to be described later (S255).

Further, after S235, the control unit 100 performs image recognition processing for the image captured by the terminal 20 (S245). Subsequently, the control unit 100 specifies position information of the speaker based on a result of the recognition in S245 (S247). Furthermore, the control unit 100 recognizes persons present around the speaker based on the result of the recognition in S245, and acquires demographic information of these persons based on such a recognition result (S249). Thereafter, the control unit 100 performs the processing of S255.

Further, after S235, the control unit 100 acquires position information of the terminal 20, which is specified based on a signal received by the terminal 20 from a positioning satellite, for example, such as a GPS (S251). Thereafter, the control unit 100 performs the processing of S255.

Further, after S235, the control unit 100 specifies a content of a schedule of the speaker, which is registered in a scheduler for example, and based on the specified content, specifies the location where the speaker should be located (S253). Thereafter, the control unit 100 performs the processing of S255.

{2-3-3. Processing for Updating Application Range of Learning Result}

Figure 17:
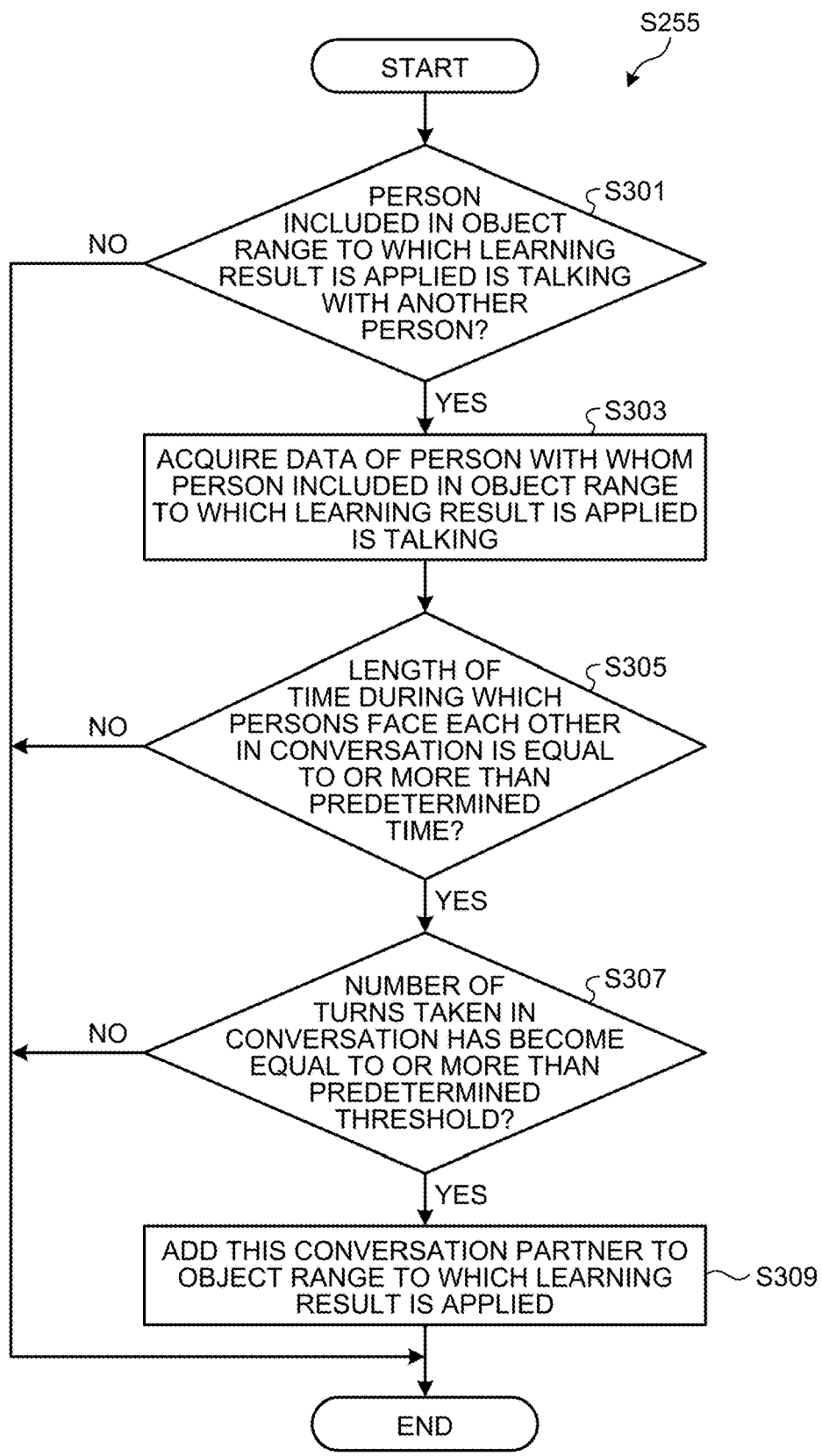
FIG. 17 is a flowchart illustrating a flow of "processing for updating application range of learning result" according to the present embodiment.

Next, with reference to FIG. 17, a description will be given of the flow of "processing for updating applied range of learning result" in S255. As illustrated in FIG. 17, first, the control unit 100 determines whether or not a person included in an object range to which the learning result is applied is talking with another person based on various sensing results (captured images and the like) acquired by the terminal 20 (S301). When it is determined that this person is not talking with another person (S301: No), this "processing for updating applied range of learning result" ends.

Meanwhile, when it is determined that the person is talking with another person (S301: Yes), first, the control unit 100 acquires data regarding a partner with whom the person included in the object range to which the learning result is applied is talking (S303).

Subsequently, the control unit 100 determines whether or not a length of time during which the person is facing another person during such a conversation is equal to or more than a predetermined time (S305). When the length of time during which the person is facing such another person is less than the predetermined time (S305: No), this "processing for updating applied range of learning result" ends.

Meanwhile, when the length of time during which the person is facing such another person is equal to or more than the predetermined time (S305: Yes), then the control unit 100 determines whether or not the number of turns taken in this conversation has become equal to or more than a predetermined threshold (S307). When the number of turns taken in the conversation is less than the predetermined threshold (S307: No), this "processing for updating application range of learning result" ends.

Meanwhile, when the number of turns taken in the conversation has become equal to or more than the predetermined threshold (S307: Yes), the learning unit 108 adds the partner, with whom this person is talking, to an object range to which the learning result is applied (S309).

{2-3-4. Processing for Determining Whether or not to Learn}

Figure 18:
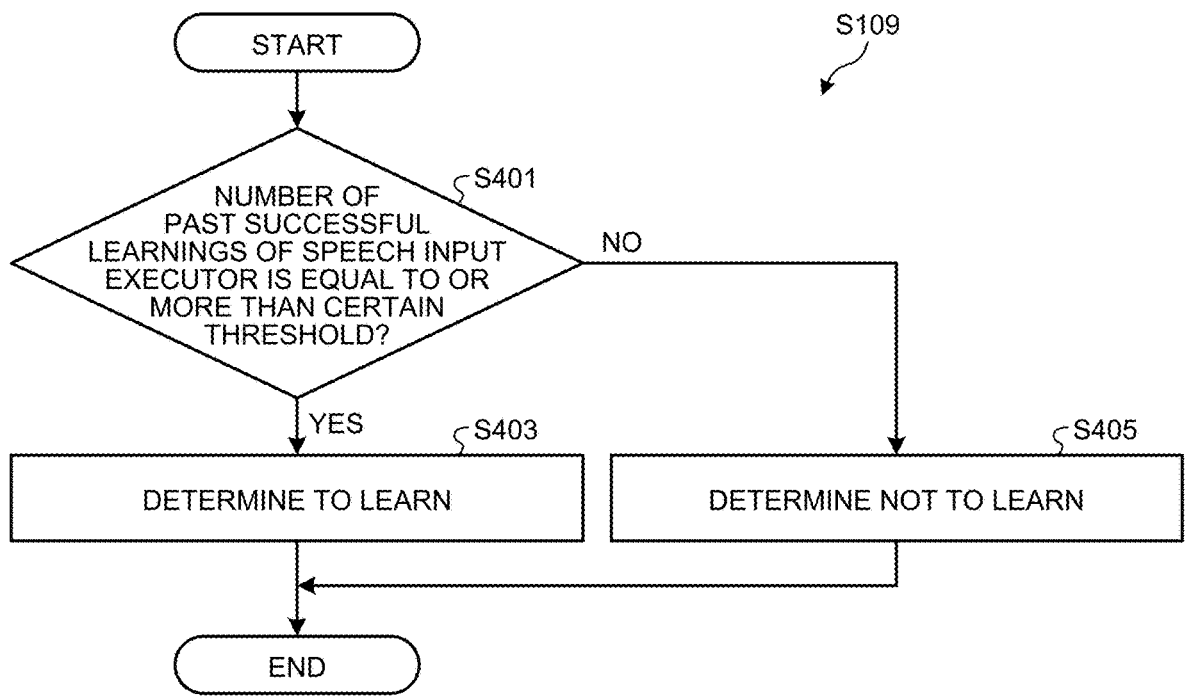
FIG. 18 is a flowchart illustrating a flow of "processing for determining whether or not to learn" according to the present embodiment.

Next, a flow of "processing for determining whether or not to learn" in S109 will be described with reference to FIG. 18. As illustrated in FIG. 18, the learning unit 108 determines whether or not the number of successful learnings of the speaker in the past is equal to or more than a predetermined threshold (S401). When the number of successful learnings of the speaker in the past is equal to or more than the predetermined threshold (S401: Yes), the learning unit 108 determines to learn the utterance (S403). Meanwhile, when the number of successful learnings of the speaker in the past is less than the predetermined threshold or more (S401: No), the learning unit 108 determines not to learn the utterance (S405).

Note that the flow of the processing of S109 is not limited to the example illustrated in FIG. 18. For example, any one of "First modification" to "Fourth modification", which are illustrated in FIGS. 19 to 22 may be applied as the flow of the processing of S109 instead of the example illustrated in FIG. 18. Alternatively, any two or more of "First modification" to "Fourth modification" and the example illustrated in FIG. 18 may be executed in parallel, and results of these may be combined together.

(2-3-4-1. First Modification)

Figure 19:
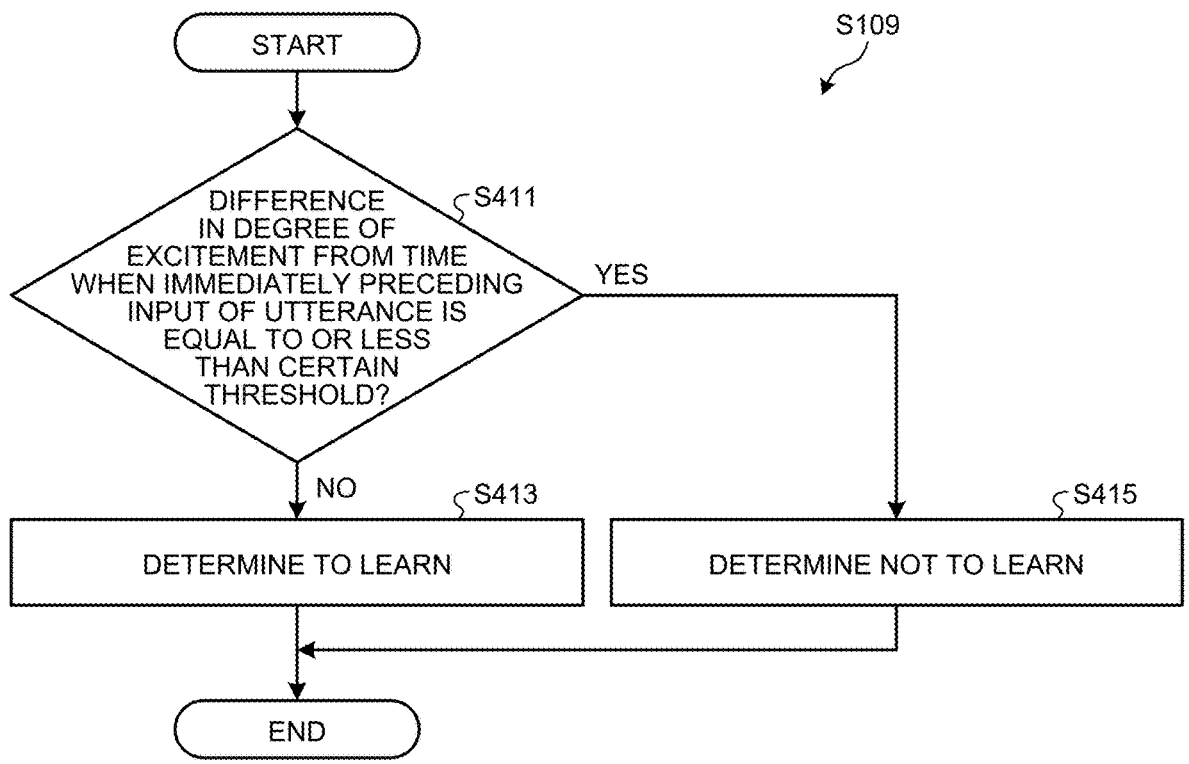
FIG. 19 is a flowchart illustrating a flow of a first modification of "processing for determining whether or not to learn".

FIG. 19 is a flowchart illustrating a flow of processing according to the first modification of S109. As illustrated in FIG. 19, in the present modification, the learning unit 108 determines whether or not a difference in a degree of excitement of the speaker of the utterance between the time when another utterance collected immediately before this utterance and the time of this utterance is equal to or less than a predetermined threshold (S411). When the difference in the degree of excitement of the speaker of the utterance is more than the predetermined threshold (S411: No), the learning unit 108 determines not to learn the utterance (S413). Meanwhile, when the difference in the degree of excitement of the speaker of the utterance is equal to or less than the predetermined threshold (S411: Yes), the learning unit 108 determines not to learn the utterance (S415).

(2-3-4-2. Second Modification)

Figure 20:
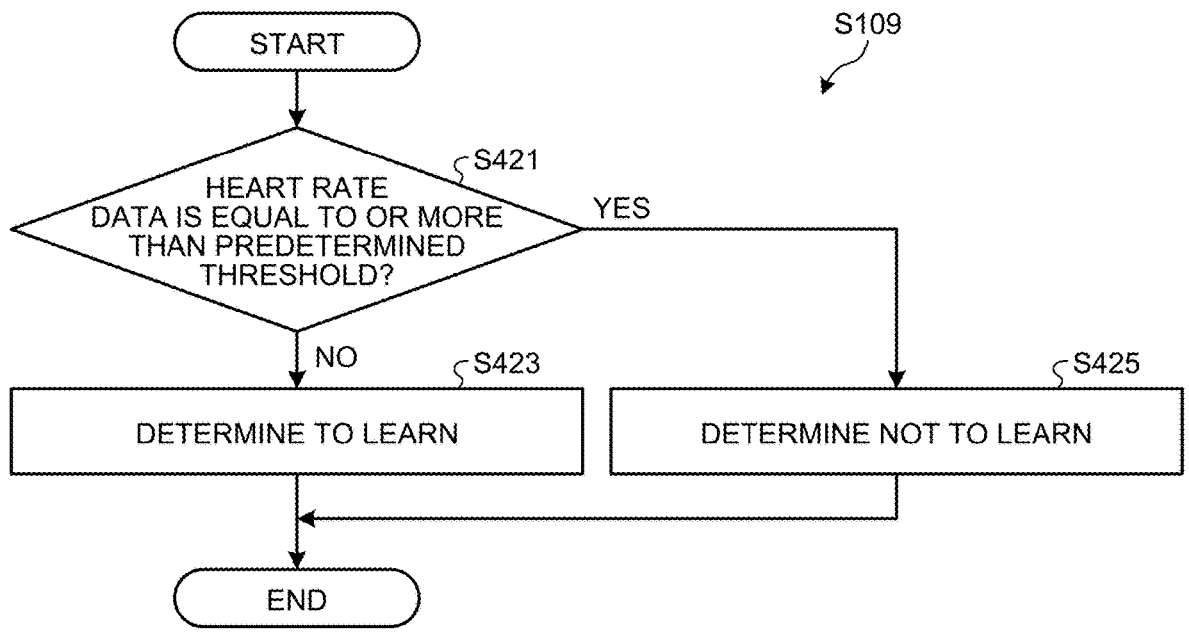
FIG. 20 is a flowchart illustrating a flow of a second modification of "processing for determining whether or not to learn".

FIG. 20 is a flowchart illustrating a flow of processing according to the second modification of S109. As illustrated in FIG. 20, in the present modification, the learning unit 108 determines whether or not a value indicated by the heart rate data of the speaker of the utterance is equal to or more than a predetermined threshold (S421). When the value indicated by the heart rate data is less than the predetermined threshold (S421: No), the learning unit 108 determines to learn the utterance (S423). Meanwhile, when the value indicated by the heart rate data is equal to or larger than the predetermined threshold (S421: Yes), the learning unit 108 determines not to learn the utterance (S425).

(2-3-4-3. Third Modification)

Figure 21:
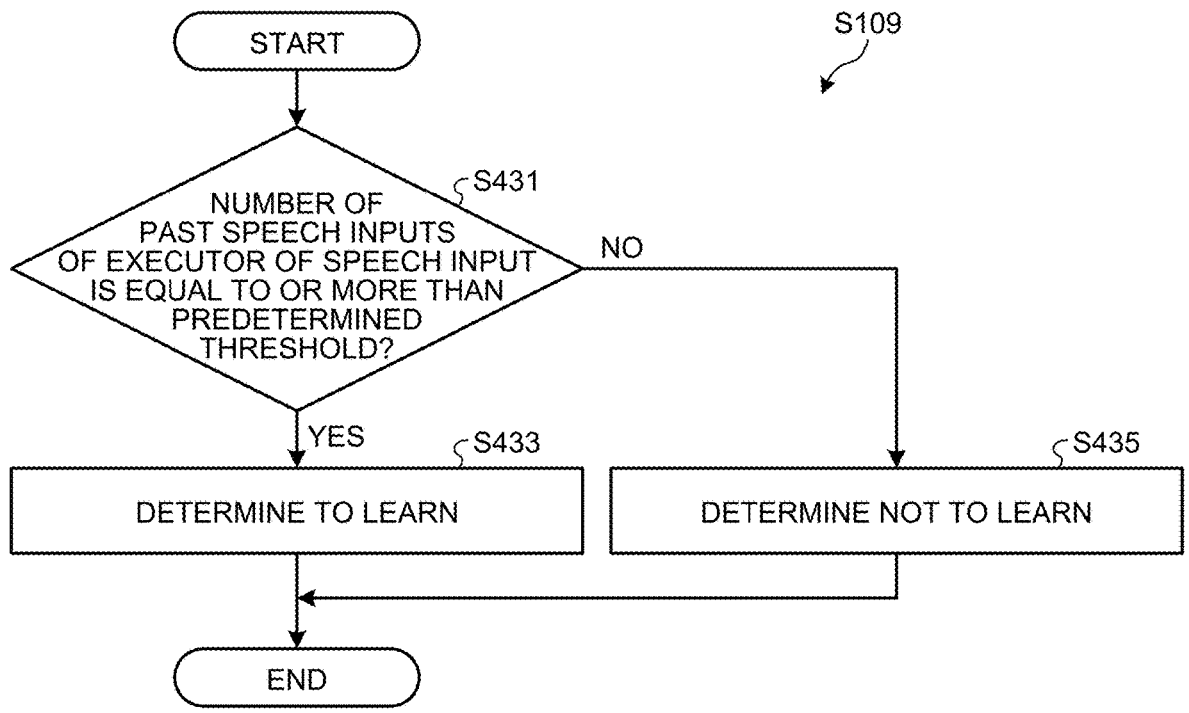
FIG. 21 is a flowchart illustrating a flow of a third modification of "processing for determining whether or not to learn".

FIG. 21 is a flowchart illustrating a flow of processing according to the third modification of S109. As illustrated in FIG. 21, in the present modification, the learning unit 108 determines whether or not the number of speech inputs implemented by the speaker of the utterance in the past is equal to or more than a predetermined threshold (S431). When the number of speech inputs implemented by the speaker in the past is equal to or more than the predetermined threshold (S431: Yes), the learning unit 108 determines to learn the utterance (S433). Meanwhile, when the number of speech inputs implemented by the speaker in the past is less than the predetermined threshold (S431: No), the learning unit 108 determines not to learn the utterance (S435).

(2-3-4-4. Fourth Modification)

Figure 22:
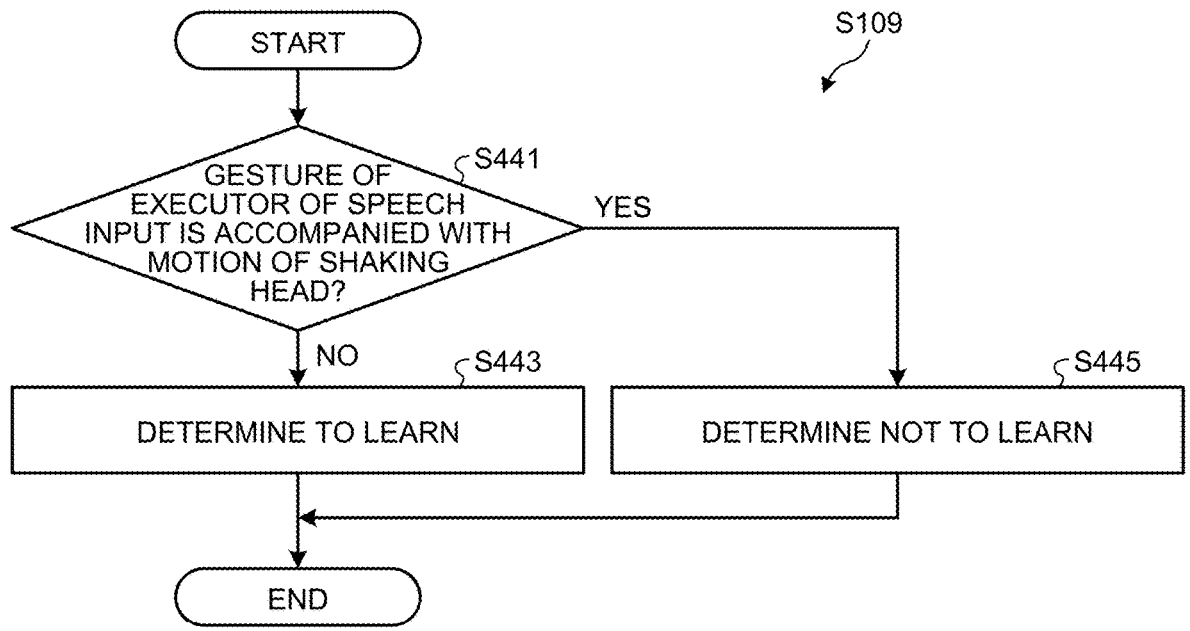
FIG. 22 is a flowchart illustrating a flow of a fourth modification of "processing for determining whether or not to learn".

FIG. 22 is a flowchart illustrating a flow of processing according to the fourth modification of S109. As illustrated in FIG. 22, in the present modification, the learning unit 108 determines whether or not the speaker of the utterance has performed a gesture accompanied with a motion of shaking the head at the time of the utterance (S441). When the speaker of the utterance has not performed the gesture accompanied with the motion of shaking the head at the time of the utterance (S441: No), the learning unit 108 determines to learn the utterance (S443). Meanwhile, when the speaker of the utterance has performed the gesture accompanied with the motion of shaking the head at the time of the utterance (S441: Yes), the learning unit 108 determines not to learn the utterance (S445).

{2-3-5. Processing for Determining Applied Range of Learning Result}

Figure 23:
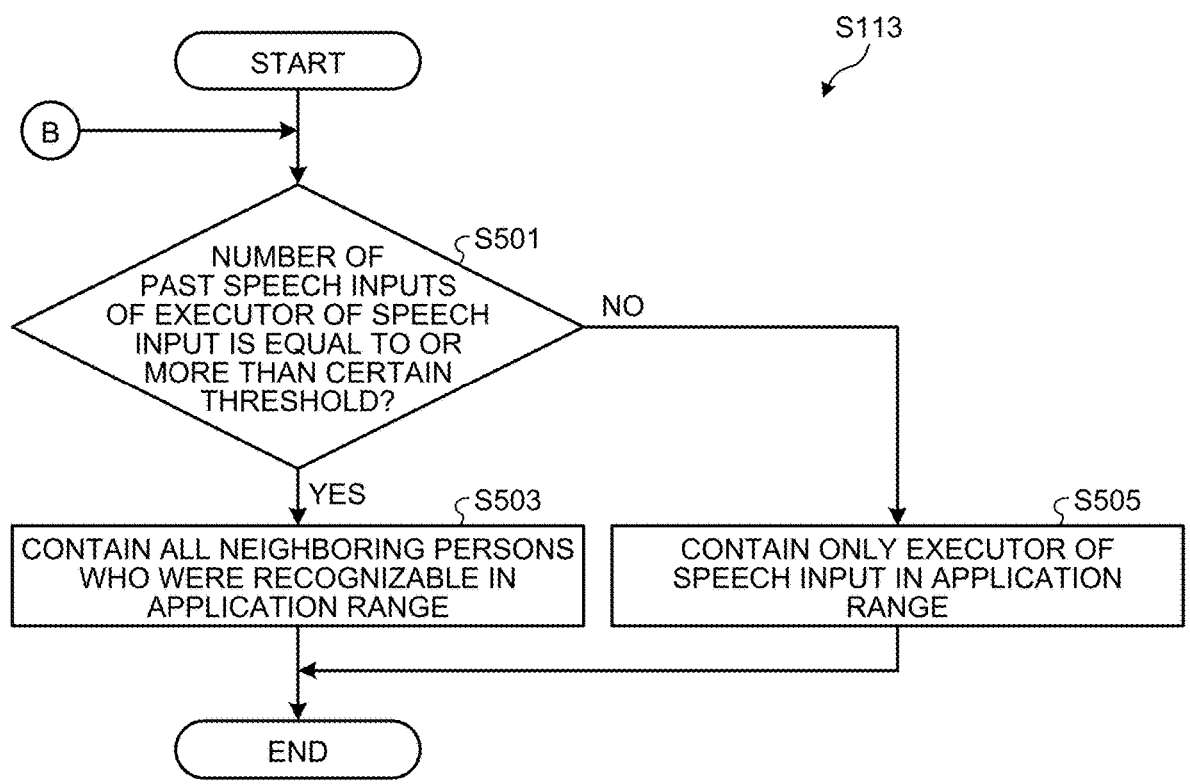
FIG. 23 is a flowchart illustrating a flow of "determination processing for application range of learning result" according to the present embodiment.

Next, with reference to FIG. 23, a description will be given of the flow of "processing for determining applied range of learning result" in S113. As illustrated in FIG. 23, the learning unit 108 determines whether or not the number of speech inputs implemented by the speaker of the utterance in the past is equal to or more than a predetermined threshold (S501). When the number of speech inputs implemented by the speaker in the past is equal to or more than the predetermined threshold (S501: Yes), the learning unit 108 determines to register all of the recognized persons, who are present around the terminal 20, as application object users of the learning result (S503). Meanwhile, when the number of speech inputs implemented by the speaker in the past is less than the predetermined threshold (S501: No), the learning unit 108 determines to register only the speaker as such an application object user of the learning result (S505).

Note that the flow of the processing of S113 is not limited to the example illustrated in FIG. 23. For example, any one of "First modification" to "Fifth modification", which are illustrated in FIGS. 24 to 28 may be applied as the flow of the processing of S113 instead of the example illustrated in FIG. 23. Alternatively, any two or more of "First modification" to "Fifth modification" and the example illustrated in FIG. 23 may be executed in parallel, and results of these may be combined together.

(2-3-5-1. First Modification)

Figure 24:
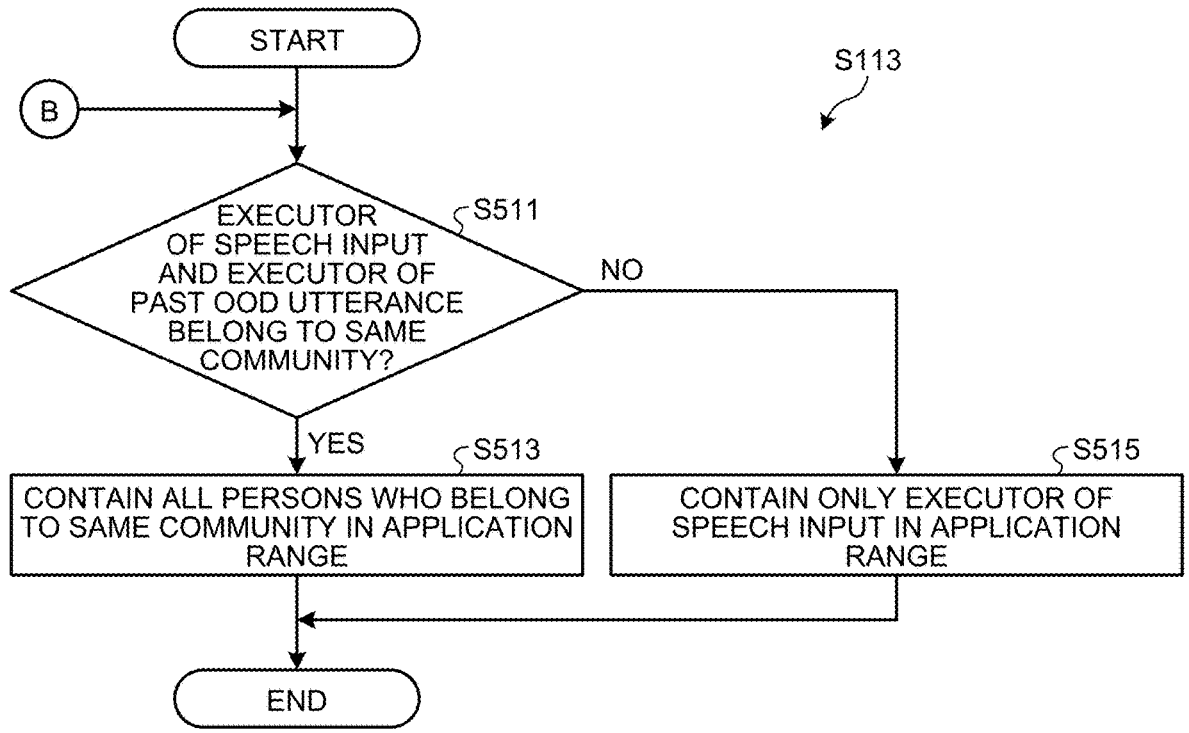
FIG. 24 is a flowchart illustrating a flow of a first modification of "determination processing for application range of learning result".

FIG. 24 is a flowchart illustrating a flow of the processing according to the first modification of S113. As illustrated in FIG. 24, in the present modification, the learning unit 108 determines whether or not the speaker of this utterance and a speaker of another utterance collected immediately before this utterance and determined to be OOD belong to the same community (S511). When both belong to the same community (S511: Yes), the learning unit 108 determines to register all persons who belong to this community as application object users of the learning result (S513). Meanwhile, when both do not belong to the same community (S511: No), the learning unit 108 determines to register only the speaker as such an application object user of the learning result (S515).

(2-3-5-2. Second Modification)

Figure 25:
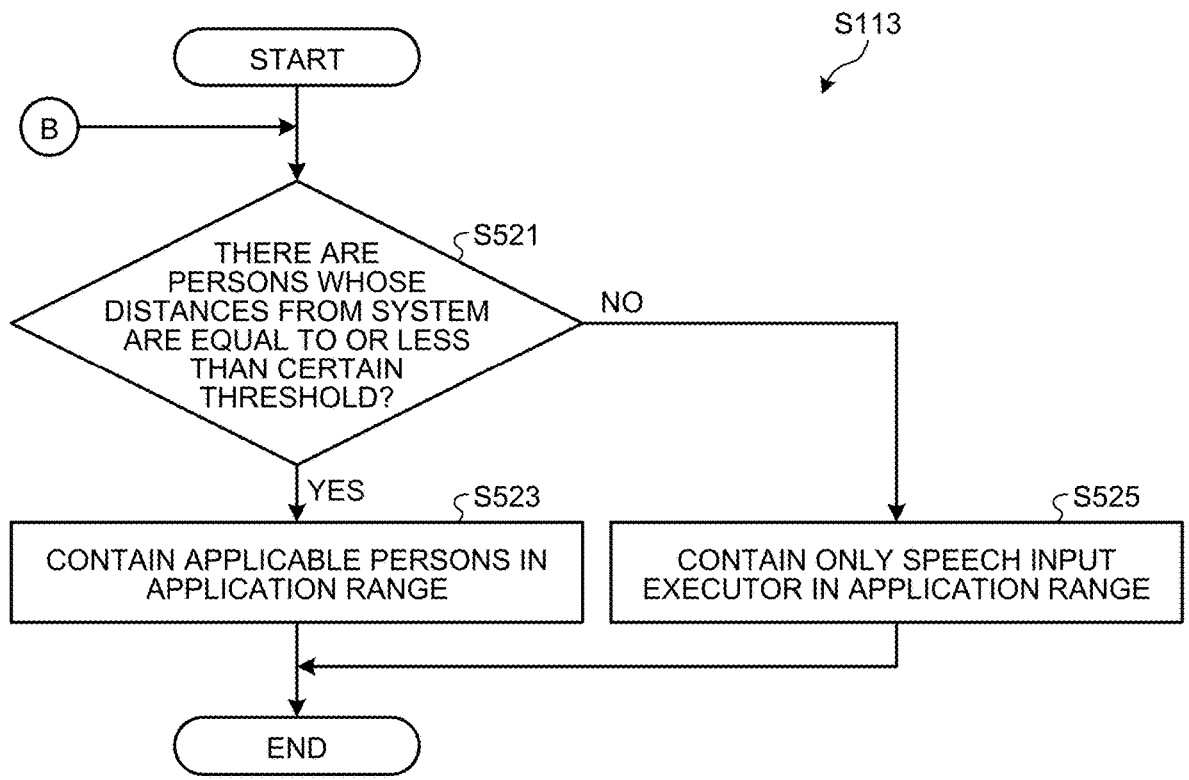
FIG. 25 is a flowchart illustrating a flow of a second modification of "determination processing for application range of learning result".

FIG. 25 is a flowchart illustrating a flow of the processing according to the second modification of S113. As illustrated in FIG. 25, in the present modification, the learning unit 108 determines whether or not there are one or more persons whose distances from the system (for example, distances from the terminal 20) are within a predetermined threshold (S521). When there are one or more persons whose distances from the system are within the predetermined threshold (S521: Yes), the learning unit 108 registers all of the persons as the application object users of the learning result (S523). Meanwhile, when there is no one whose distance from the system is within the predetermined threshold (S521: No), the learning unit 108 registers only the speaker as such an application object user of the learning result (S525).

(2-3-5-3. Third Modification)

Figure 26:
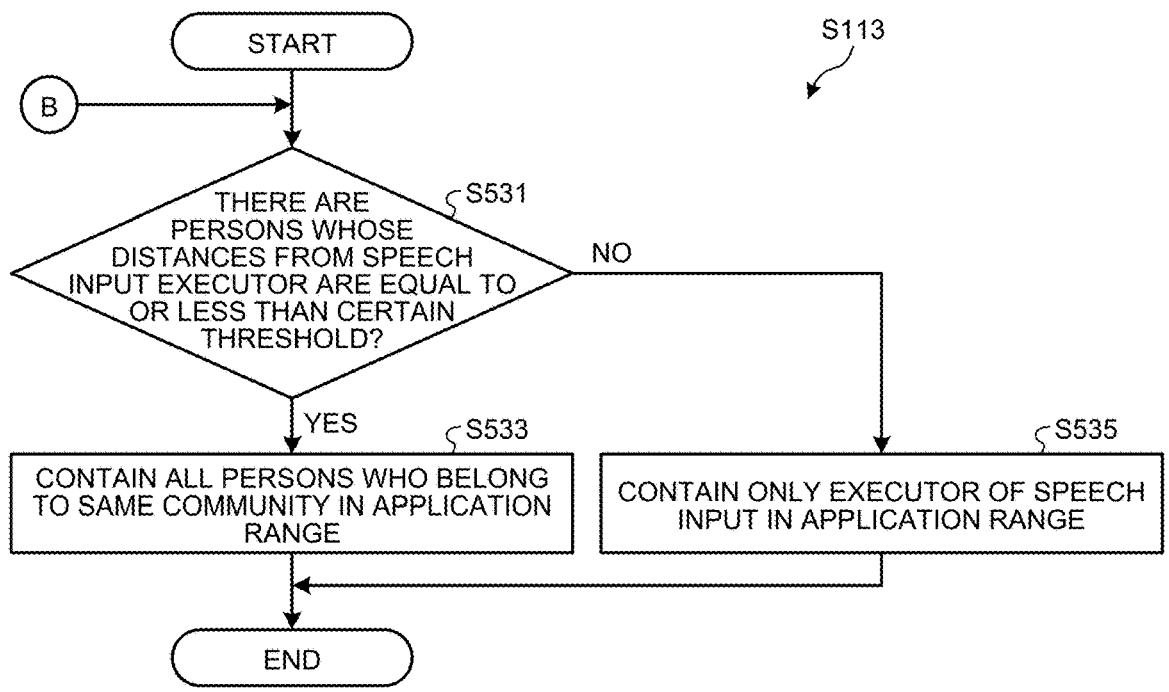
FIG. 26 is a flowchart illustrating a flow of a third modification of "determination processing for application range of learning result".

FIG. 26 is a flowchart illustrating a flow of processing according to the third modification of S113. As illustrated in FIG. 26, in the present modification, the learning unit 108 determines whether or not there are one or more persons whose distances from the speaker are within a predetermined threshold (S531). When there are one or more persons whose distances from the speaker are within the predetermined threshold (S531: Yes), the learning unit 108 registers all of the persons as the application object users of the learning result (S533). Meanwhile, when there is no one whose distance from the speaker is within the predetermined threshold (S531: No), the learning unit 108 registers only the speaker as such an application object user of the learning result (S535).

(2-3-5-4. Fourth Modification)

Figure 27:
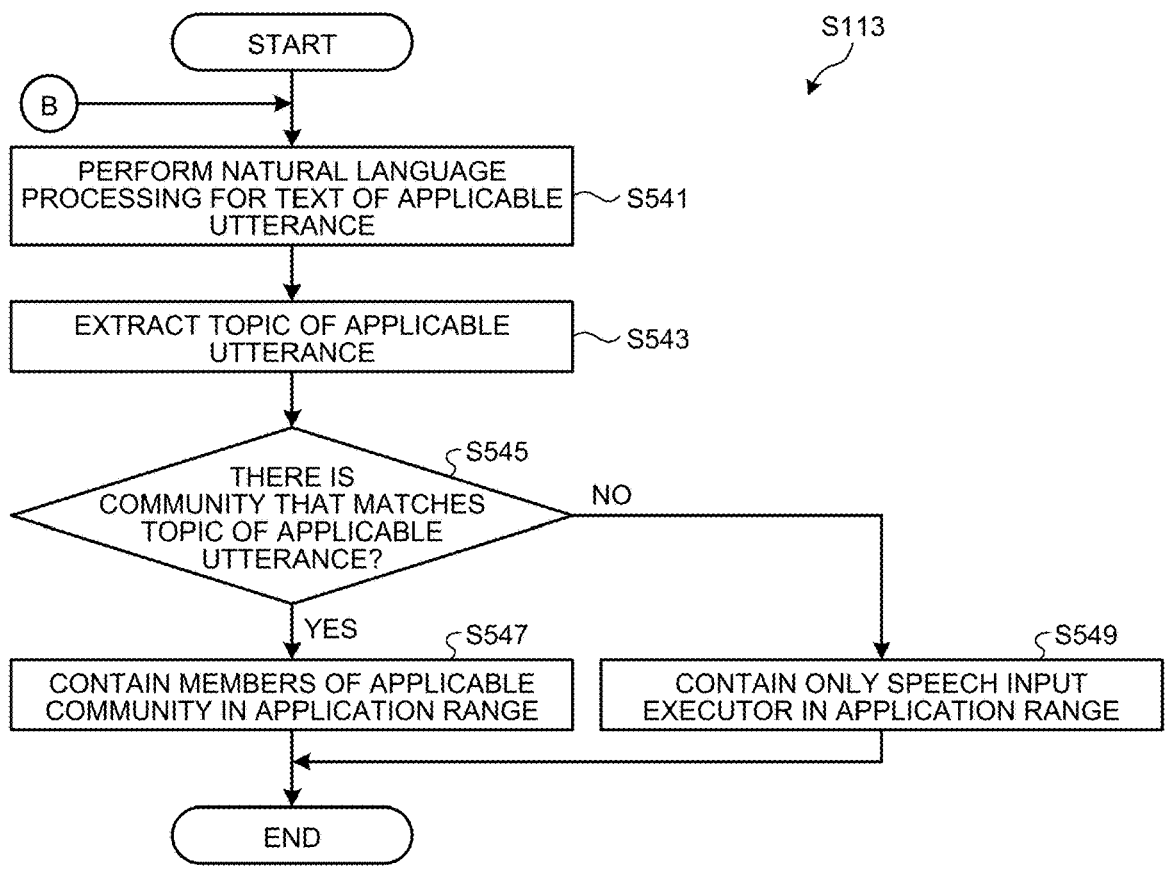
FIG. 27 is a flowchart illustrating a flow of a fourth modification of "determination processing for application range of learning result".

FIG. 27 is a flowchart illustrating a flow of processing according to the fourth modification of S113. As illustrated in FIG. 27, in the present modification, first, the semantic analysis unit 104 performs predetermined natural language processing for a text corresponding to the speech recognition result of the utterance (S541), and extracts a topic corresponding to the utterance (S543). Subsequently, the learning unit 108 determines whether or not there is a community that matches the extracted topic (S545). When there is a community that matches the topic (S545: Yes), the learning unit 108 determines to register all members who belong to the community as application object users of the learning result (S547). Meanwhile, when there is no community that matches the topic (S545: No), the learning unit 108 determines to register only the speaker as such an application object user of the learning result (S549).

(2-3-5-5. Fifth Modification)

Figure 28:
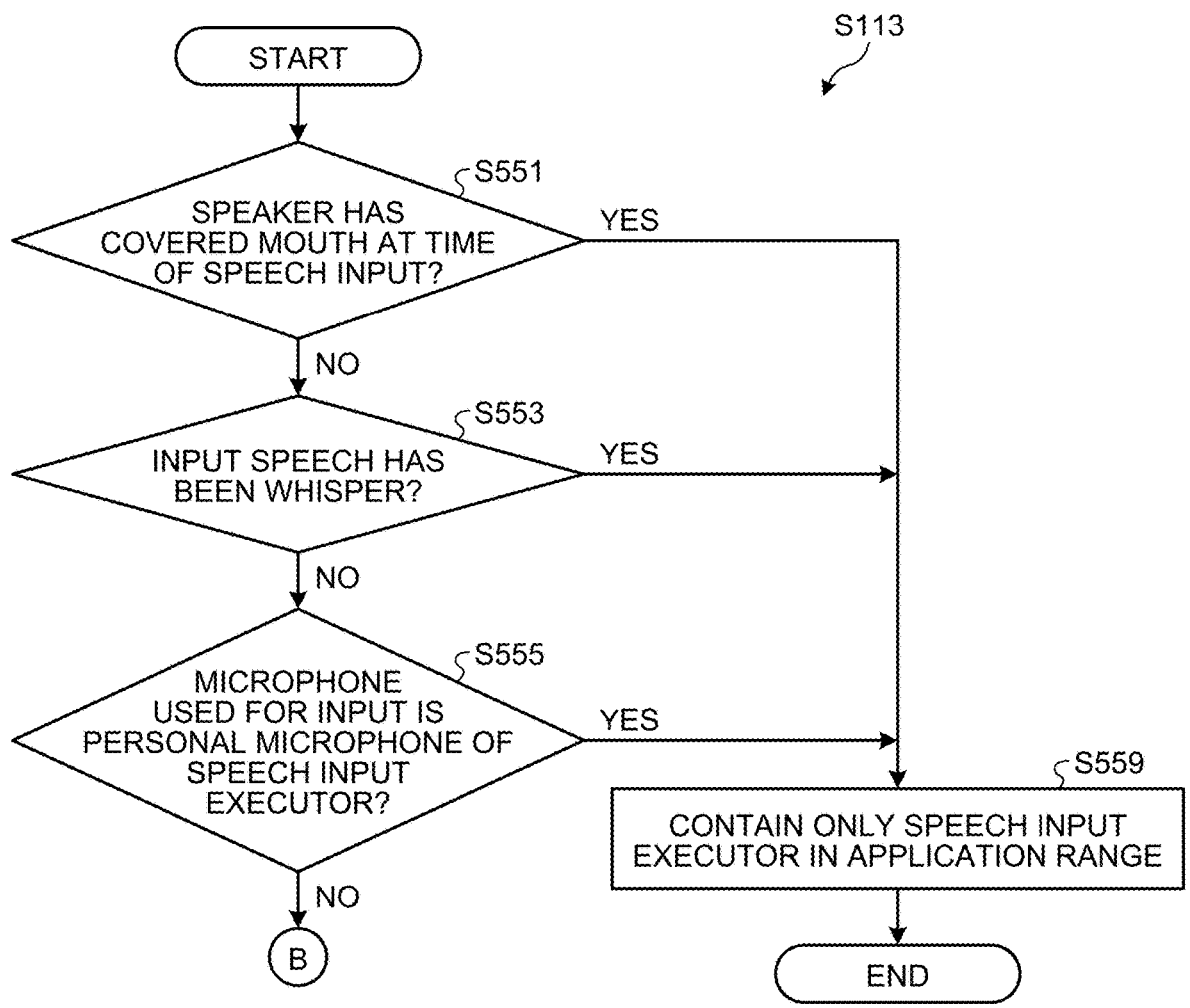
FIG. 28 is a flowchart illustrating a flow of a fifth modification of "determination processing for application range of learning result".

FIG. 28 is a flowchart illustrating a flow of processing according to the fifth modification of S113. As illustrated in FIG. 28, in the present modification, first, the learning unit 108 determines whether or not the speaker of the utterance has covered the mouth at the time of the utterance based on a sensing result (a captured image and the like) at the time of the utterance, which is acquired by the terminal 20 (S551). When it is determined that the speaker has covered the mouth at the time of the utterance (S551: Yes), the learning unit 108 determines to register only the speaker as the application object user of the learning result (S559).

Meanwhile, when it is determined that the speaker has not covered the mouth at the time of the utterance (S551: No), then the learning unit 108 determines whether or not the utterance is a whisper (S553). When the utterance is a whisper (S553: Yes), the learning unit 108 determines to register only the speaker as the application object user of the learning result (S559).

Meanwhile, when the utterance is not a whisper (S553: No), then the learning unit 108 determines whether or not a microphone used at the time of the utterance is a personal microphone of the speaker (S555). When it is determined that the microphone is a personal microphone of the speaker (S555: Yes), the learning unit 108 determines to register only the speaker as an application object user of the learning result (S559). Meanwhile, when it is determined that the microphone is not a personal microphone of the speaker (S555: No), the server 10 performs the processing of on and after S501, S511, S521, S531, or S541, which is illustrated in FIGS. 23 to 27.

2-4. Effect

{2-4-1. First Effect}

As described above, based on the determination result as to whether or not the second utterance collected at the second timing after the first timing is a restatement of the first utterance collected at the first timing, the server 10 according to the present embodiment learns the meaning corresponding to the speech recognition result of the first utterance. Therefore, the meaning corresponding to the speech recognition result of the first utterance can be learned appropriately.

For example, when it is determined that the second utterance is a restatement of the first utterance, it is impossible to specify the meaning corresponding to the speech recognition result of the first utterance, and it is possible to specify the meaning corresponding to the speech recognition result of the second utterance, then the server 10 learns the meaning corresponding to the speech recognition result of the first utterance based on the meaning corresponding to the speech recognition result of the second utterance. For this reason, even after the utterance of OOD, the user restates such an InDomain utterance, whereby the server 10 can be caused to learn that a meaning corresponding to the utterance of OOD is the same as the meaning corresponding to the InDomain utterance. As a result, it is possible to improve convenience of the speech input.

{2-4-2. Second Effect}

Further, the server 10 is capable of determining whether or not to learn the meaning corresponding to the speech recognition result of the first utterance based on the relationship between the context at the first timing and the context at the second timing. For this reason, the server 10 can accurately determine whether or not the second utterance is a restatement of the first utterance, and accordingly, can appropriately learn the meaning corresponding to the speech recognition result of the first utterance.

Further, when having determined to learn the meaning corresponding to the speech recognition result of the first utterance, the server 10 can appropriately determine, in response to the situation, one or more users to whom the learning result is applied (that is, one or more users in each of which the meaning of substantially the same utterance as the first utterance is determined to be the same as the learning result of the meaning corresponding to the speech recognition result of the first utterance when substantially the same utterance as the first utterance is made).

3. Application Example

The present embodiment is not limited to the above-mentioned example, and various application examples are applicable. Next, the application examples of the present embodiment will be described in "3-1. First application example" to "3-3. Third application example". Note that each component included in the server 10 according to each of the application examples is the same as in the example illustrated in FIG. 3. Hereinafter, only components having functions different from those of the above-mentioned embodiment will be described, and a description of the same contents will be omitted.

3-1. First Application Example

First, a first application example according to the present embodiment will be described. According to the first application example, the server 10 is capable of dynamically increasing and decreasing the applied users of the learning result.

{3-1-1. Learning Unit 108}

A learning unit 108 according to the first application example dynamically increases or decreases the applied users of the learning result based on a predetermined criterion. For example, when it is determined that a length of time during which an orientation of a body of the non-application object user of the learning result or a line of sight thereof faces the applied user of the learning result is a predetermined time or more, the learning unit 108 may dynamically add this user as such an application object user of the learning result. Alternatively, for example, when it is determined that the number of turns taken in a conversation between the non-application object user of the learning result and the applied user of the learning result, the number being specified from results of the speech recognition and results of the speaker recognition, has reached a predetermined threshold or more, the learning unit 108 may dynamically add this user as the application object user of the learning result. Alternatively, when the applied users of the learning result are all members of a certain chat group, and any of the members leaves the chat group, the learning unit 108 may dynamically exclude this left member from the applied users of the learning result.

{3-1-2. Application Example}

Figure 29:
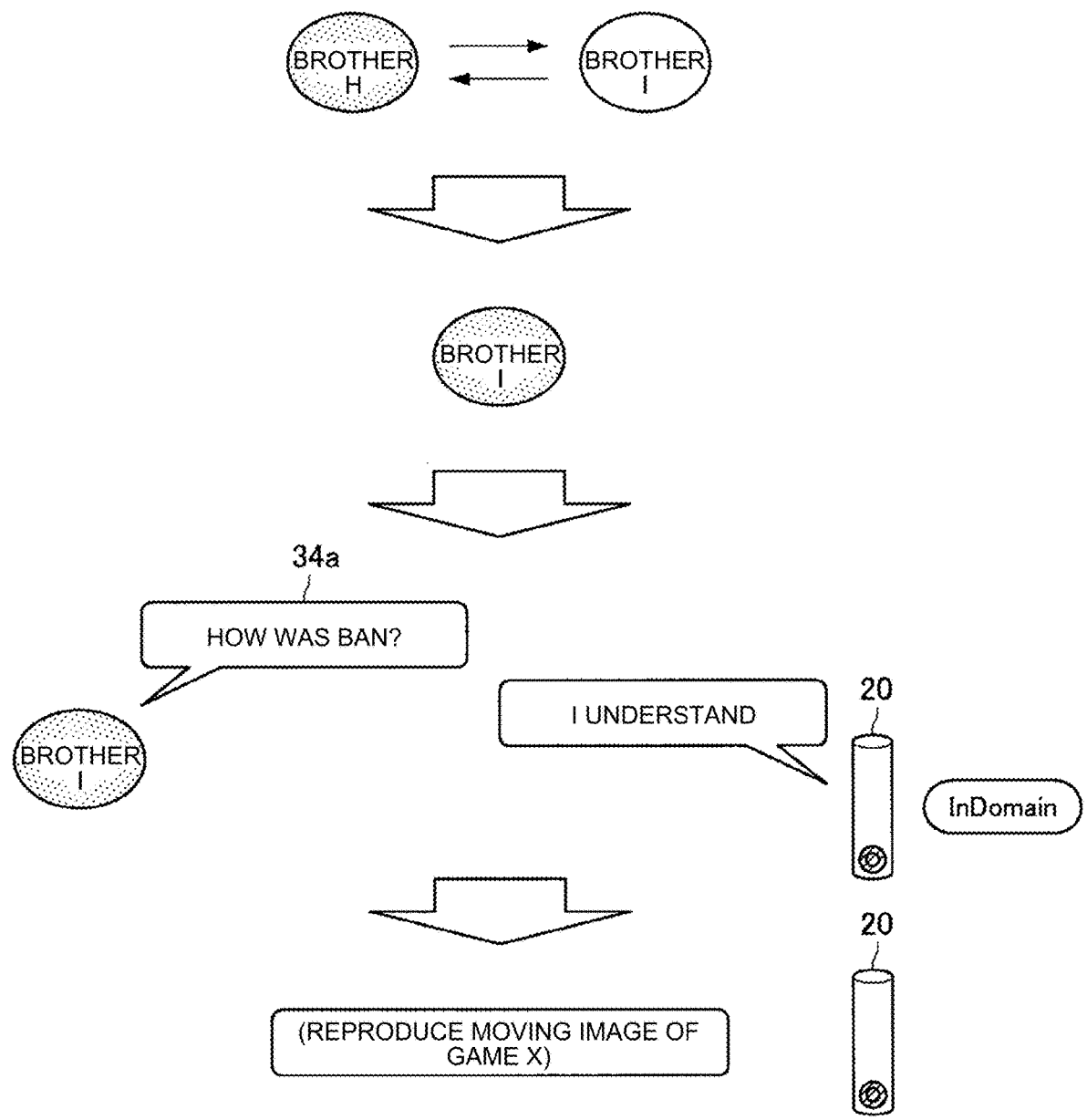
FIG. 29 is a diagram illustrating an example of dynamically adding an applied user of the learning result according to a first application example of the present embodiment.

Here, an application example of the first application example will be described with reference to FIGS. 29 and 30. In the present application example, it is assumed that the applied users of the learning result and the non-application object users of the learning result at an initial point of time are the same as in the example illustrated in FIG. 11. In other words, the applied users of the learning result are "G", "H", and "J", and the non-application object users of the learning result are "I" and First, as illustrated in FIG. 29, it is first assumed that "H" and "I" face each other and have a friendly conversation. In this case, the learning unit 108 determines that "I" is valid for "H", and temporarily adds "I" as an applied user of the learning result. It is assumed that, thereafter, as illustrated in FIG. 29, for example, "I" has made, to the terminal 20, substantially the same utterance 34a "how was BAN?" as the utterance 30a illustrated in FIG. 10, and the terminal 20 has transmitted speech data of the utterance 34a to the server 10. In this case, first, based on the learning result by the learning unit 108, the semantic analysis unit 104 of the server 10 analyzes that a meaning corresponding to the utterance 34a is "instructing to reproduce moving image of Game X" (in other words, the same meaning as the meaning corresponding to the utterance 30c illustrated in FIG. 10). Then, the output control unit 110 causes the terminal 20 to start outputting "moving image of Game X" based on a result of the analysis.

Figure 30:
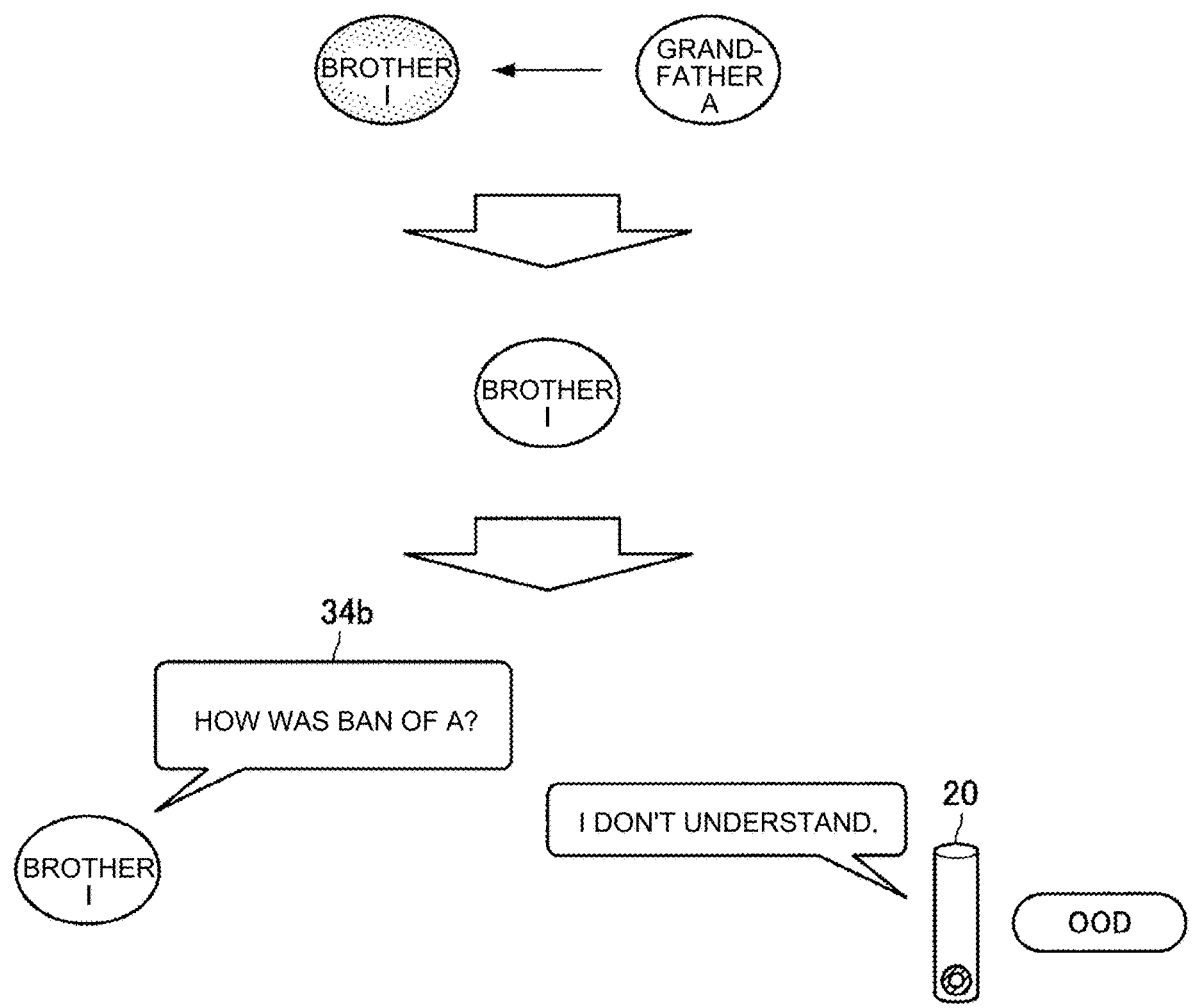
FIG. 30 is a diagram illustrating an example of dynamically reducing the applied user of the learning result according to the first application example.

It is assumed that, thereafter, as illustrated in FIG. 30, "A" has talked to "I" and "H" has moved to another place. In this case, the learning unit 108 determines that "I" has become invalid for "H", and excludes "I" from the applied users of the learning result.

3-2. Second Application Example

The first application example has been described above. Next, a second application example according to the present embodiment will be described. According to the second application example, the server 10 is capable of inquiring at least one of the applied users of the learning result to dynamically increase the applied users of the learning result.

{3-2-1. Learning Unit 108}

When having determined to dynamically add one or more users as the applied users of the learning result, a learning unit 108 according to the second application example 2 inquires at least one of the applied users of the learning result about whether or not the one or more users are permitted to be added. Further, when having acquired, from the applied user of the learning result, an answer indicating that the one or more users are permitted to be added, the learning unit 108 dynamically adds the one or more users as the applied users of the learning result.

{3-2-2. Application Example}

Here, an application example of the second application example will be described with reference to FIGS. 31 and 32. In the present application example, it is assumed that the applied users of the learning result and the non-application object users of the learning result at an initial point of time are individually the same as in the first application example (that is, the same as in the example illustrated in FIG. 11).

Figure 31:
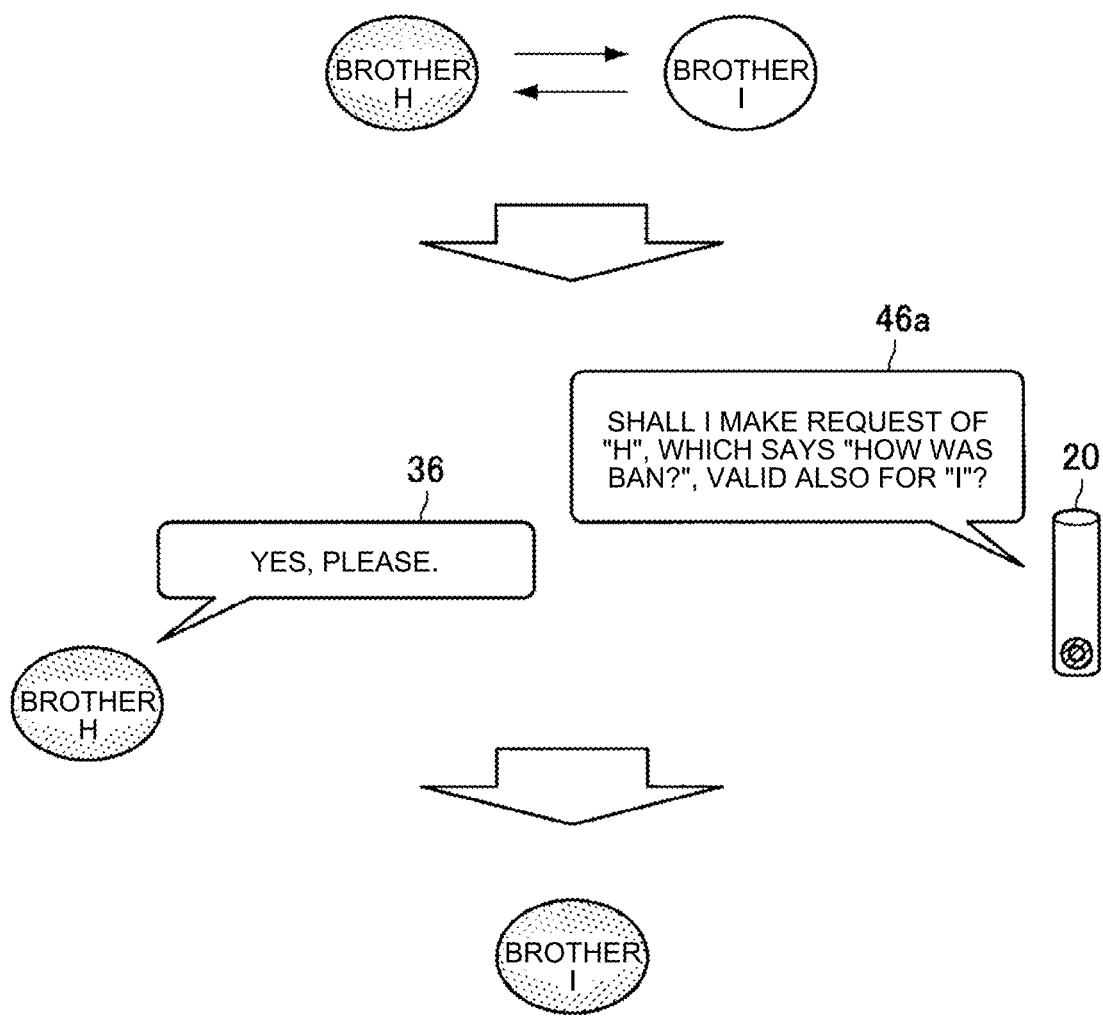
FIG. 31 is a diagram illustrating an example of dynamically adding an applied user of a learning result according to a second application example of the present embodiment.

First, as illustrated in FIG. 31, it is first assumed that "H" and "I" face each other and have a friendly conversation. In this case, the learning unit 108 determines that "I" is valid for "H", and determines to temporarily add "I" as an applied user of the learning result. Then, the learning unit 108 causes the terminal 20 to output, to "H", for example, such a speech 46a to inquire "H" about whether or not "I" is permitted to be added to the applied user of the learning result. The speech 46a is such as "shall I make the request of 'H', which says 'how was BAN?', valid also for 'I'?". It is assumed that, thereafter, as illustrated in FIG. 31, "H" has made an utterance 36 to permit the speech for this inquiry to the terminal 20, and that the terminal 20 has transmitted speech data of the utterance 36 to the server 10. In this case, the learning unit 108 dynamically adds "I" to the applied users of the learning result based on a result of speech recognition of the utterance 36.

Figure 32:
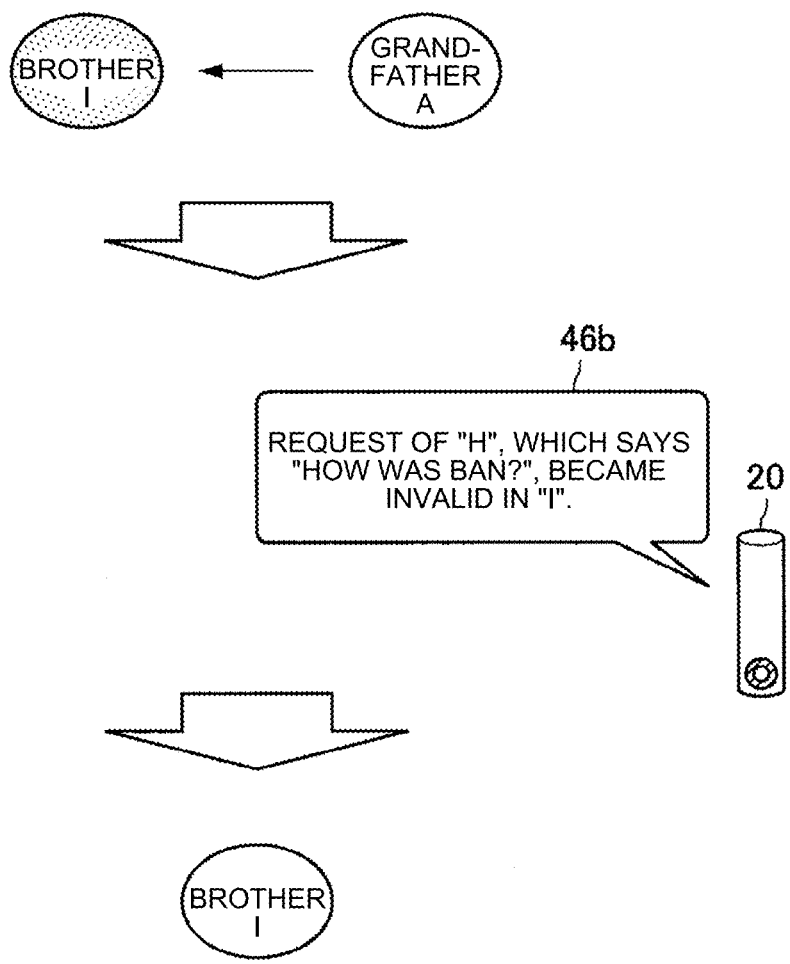
FIG. 32 is a diagram illustrating an example of dynamically reducing the applied user of the learning result according to the second application example.

It is assumed that, thereafter, as illustrated in FIG. 32, "A" has talked to "I" and "H" has moved to another place. In this case, the learning unit 108 determines that "I" has become invalid for "H", and excludes "I" from the applied users of the learning result. Further, as illustrated in FIG. 32, the output control unit 110 causes the terminal 20 to output a speech 46b that issues a notice that "I" has been excluded from the applied users of the learning result.

{3-2-3. Flow of Processing}

Figure 33:
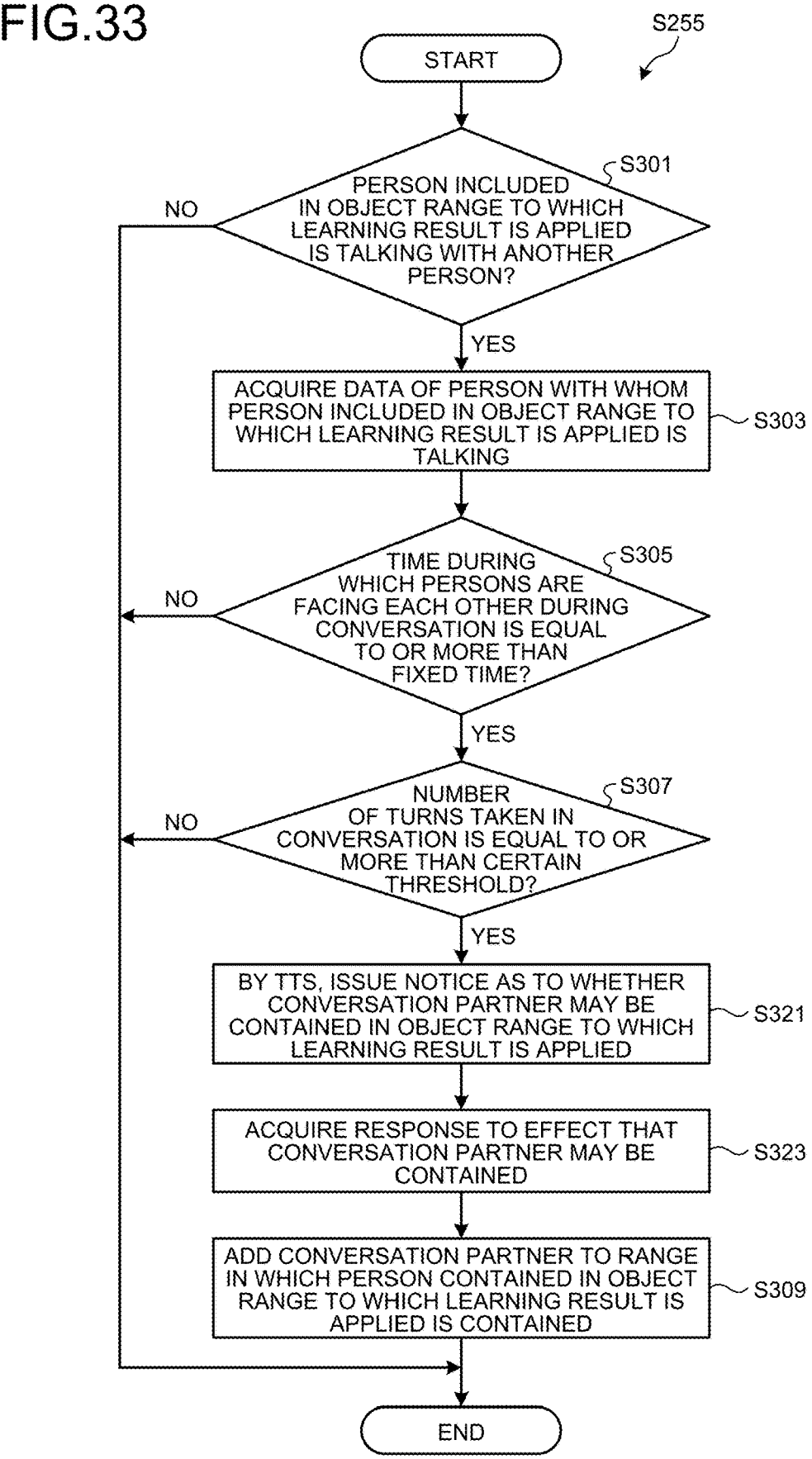
FIG. 33 is a flowchart illustrating a flow of "processing for updating application range of learning result" according to the second application example.

Next, a flow of processing according to the second application example will be described with reference to FIG. 33. The flow of this processing is the same as that of the above-mentioned embodiment, except for "processing for updating application range of learning result" illustrated in FIG. 17. Further, as illustrated in FIG. 33, S301 to S307 are the same as in the example illustrated in FIG. 17.

When the number of turns taken in the conversation is equal to or more than the predetermined threshold in S307 (S307: Yes), the learning unit 108 causes the terminal 20 to output a TTS for inquiring whether or not a partner, with whom this user is talking, is permitted to be added to the object range to which the learning result is applied (S321). Thereafter, when an answer indicating a consent to the inquiry is obtained from the user (S323), the learning unit 108 dynamically adds the partner, with whom the user is talking, to the object range to which the learning result is applied (S309).

3-3. Third Application Example

The second application example has been described above. Next, a third application example according to the present embodiment will be described. According to the third application example, when two utterances of InDomain corresponding to an utterance of OOD are consecutively collected after the utterance of this OOD is collected, the server 10 can appropriately determine a learning object meaning, which corresponds to either of the two utterances, as a meaning corresponding to the utterance of this OOD.

{3-3-1. Learning Unit 108}

When it is determined that the above-mentioned second utterance is a restatement of the first utterance, and it is determined that a third utterance collected at third timing after the second timing is also a restatement of the first utterance, then based on either the meaning corresponding to the speech recognition result of the second utterance or a meaning corresponding to a speech recognition result of the third utterance, the learning unit 108 according to the third modification learns the meaning corresponding to the speech recognition result of the first utterance. Based on a predetermined criterion, for example, the learning unit 108 selects either the meaning corresponding to the speech recognition result of the second utterance and the meaning corresponding to the speech recognition result of the third utterance as a base for learning the meaning corresponding to the speech recognition result of the first utterance.

Here, the predetermined criterion may be information indicating a relationship between the speaker of the first utterance and the speaker of the second utterance and information indicating a relationship between the speaker of the first utterance and the speaker of the third utterance. Alternatively, the predetermined criterion may be demographic information of the speaker of the first utterance. Alternatively, the predetermined criterion may be a result of comparison between a degree of abstraction of the meaning corresponding to the speech recognition result of the second utterance and a degree of abstraction of the meaning corresponding to the speech recognition result of the third utterance. For example, the learning unit 108 may determine to learn, as the meaning corresponding to the speech recognition result of first utterance, a meaning with a lower degree of abstraction between the meaning corresponding to the speech recognition result of the second utterance and the meaning corresponding to the speech recognition result of the third utterance.

{3-3-2. Application Example}

Here, an application example of the third application example will be described with reference to FIGS. 34 and 35. In the present application example, it is assumed that a relationship between the users at an initial point of time is the same as in the example illustrated in FIG. 4.

Figure 34:
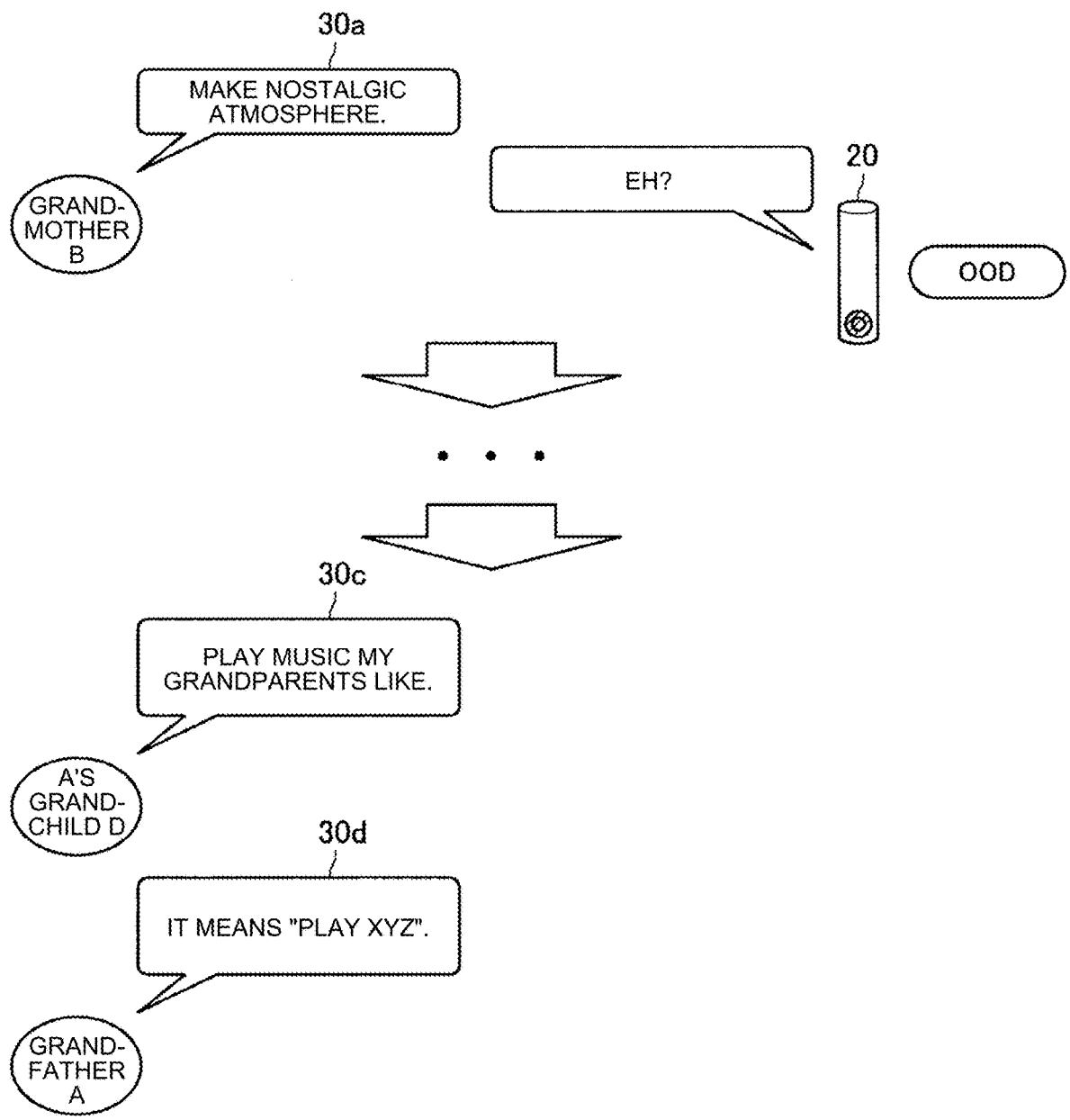
FIG. 34 is a diagram illustrating an example of utterances on the terminal 20 by a plurality of users according to a third application example of the present embodiment.
Figure 35:
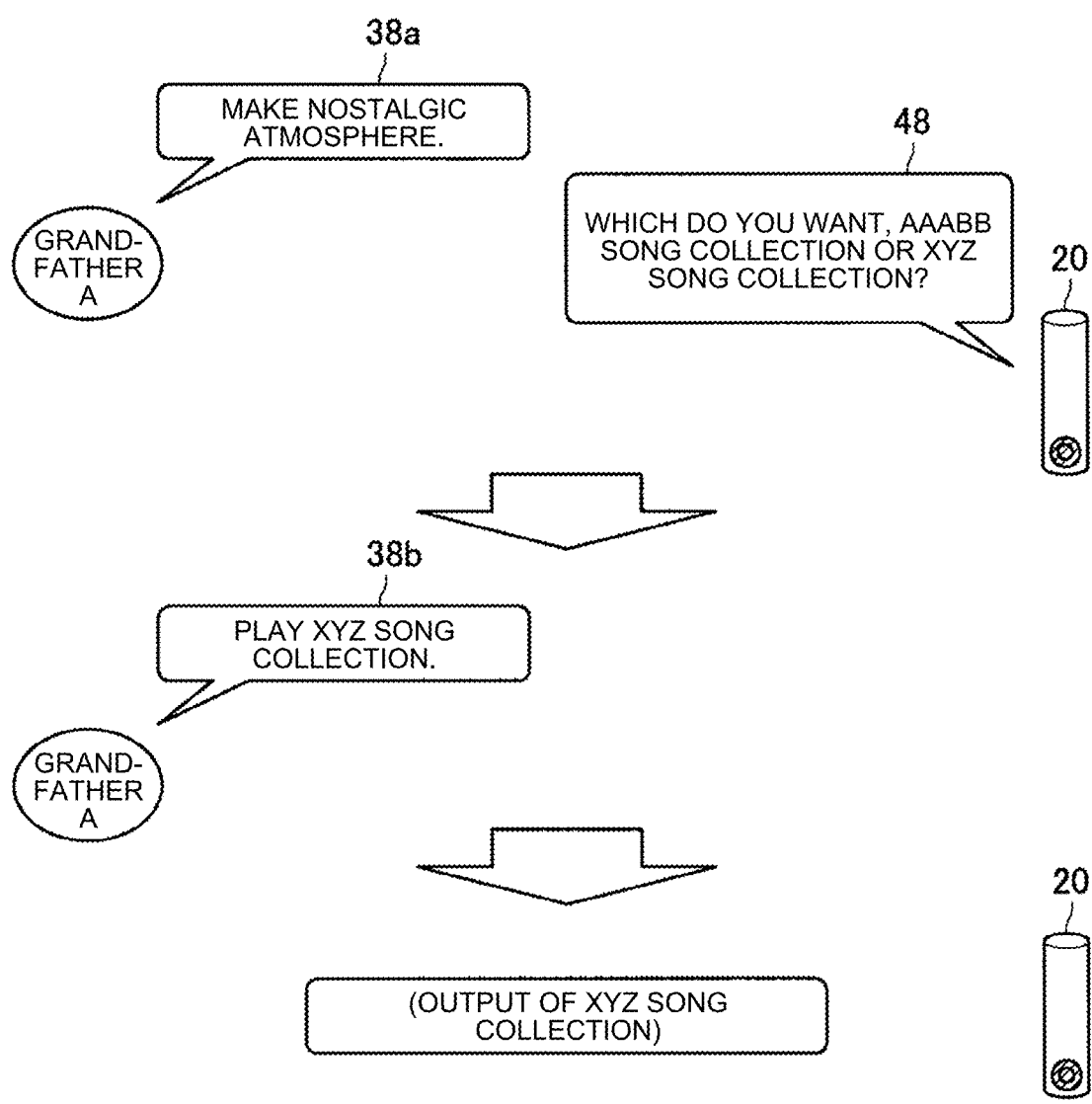
FIG. 35 is a diagram illustrating an example of processing executed by the terminal 20 in a case where the utterances are collected after a situation illustrated in FIG. 34.

As illustrated in FIG. 34, it is assumed to be determined that, first, the grandmother "B" makes an utterance 30a "make a nostalgic atmosphere." to the terminal 20, the terminal 20 transmits speech data of the utterance 30a to the server 10, and the server 10 determines that the utterance 30a is OOD. It is assumed that, thereafter, the grandchild "D" makes an utterance 30c "play music my grandparents like." as a restatement of the utterance 30a to the terminal 20, the terminal 20 transmits speech data of the utterance 30c to the server 10, and the server 10 determines that the utterance 30c is InDomain. Further, it is assumed that, immediately thereafter, the grandfather "A" makes an utterance 30d "it means 'play XYZ'." as a restatement of the utterance 30a to the terminal 20, the terminal 20 transmits speech data of the utterance 30d to the server 10, and the server 10 determines that the utterance 30d is also InDomain. In this case, for example, the learning unit 108 may determine that "D" and "A" have a closer relationship than "D" and "B", and may learn a meaning corresponding to the utterance 30a so that the meaning corresponding to the utterance 30a becomes the same as a meaning corresponding to the utterance 30d.

(3-3-2-1. Modification)

As a modification, the learning unit 108 may learn, as the meaning corresponding to the utterance 30a, both the meaning corresponding to the utterance 30c and the meaning corresponding to the utterance 30d. Hereinafter, an application example according to this modification will be described with reference to FIG. 35. As illustrated in FIG. 35, it is assumed that, after the learning, for example, "A" has made, to the terminal 20, substantially the same utterance 38a as the utterance 30a, and the terminal 20 has transmitted speech data of the utterance 38a to the server 10. In this case, first, based on the learning result by the learning unit 108, the semantic analysis unit 104 of the server 10 analyzes that both of the meaning corresponding to the utterance 30c and the meaning corresponding to the utterance 30d are present as the meaning corresponding to the utterance 38a. Then, as illustrated in FIG. 35, based on a result of the analysis, the output control unit 110 causes the terminal 20 to output a speech 48 (for example, "which do you want, AAABB song collection or XYZ song collection?") to "A" for making an inquiry as to which of processing corresponding to the meaning of the utterance 30c (that is, reproducing "AAABB song collection") and processing corresponding to the meaning of the utterance 30d (that is, reproducing "XYZ song collection") is to be executed. It is assumed that, thereafter, as illustrated in FIG. 35, "A" has made an utterance 38b (for example, "play XYZ song collection" and the like) instructing execution of the processing corresponding to the meaning of utterance 30d (that is, reproducing "XYZ song collection") to the terminal 20, and the terminal 20 has transmitted speech data of the utterance 38b to the server 10. In this case, the output control unit 110 causes the terminal 20 to start outputting "XYZ song collection" based on a result of speech recognition of the utterance 38b.

4. Hardware Configuration

Figure 36:
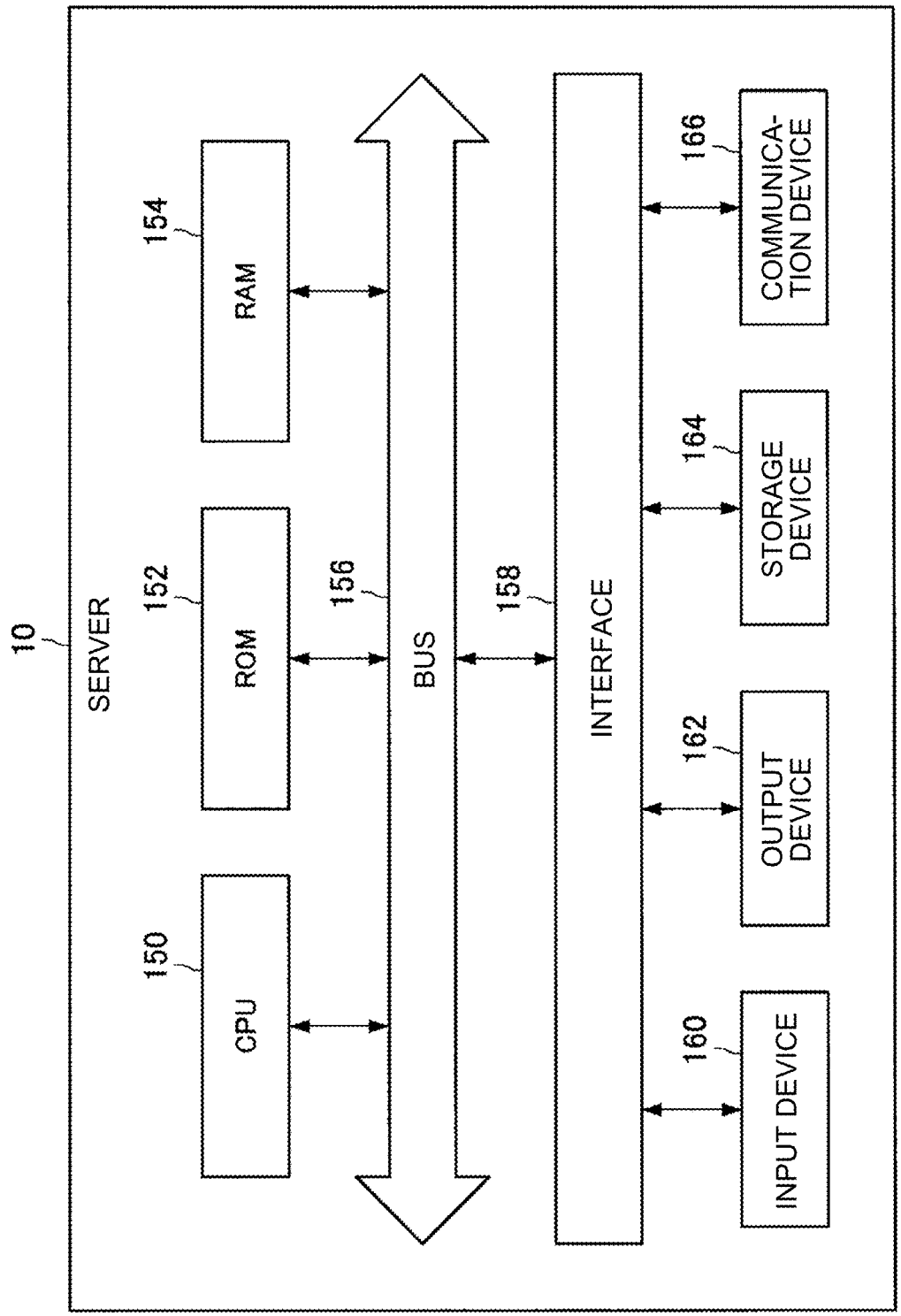
FIG. 36 is a diagram illustrating a hardware configuration example of the server 10.

Next, an example of a hardware configuration of the server 10 according to the present embodiment will be described with reference to FIG. 36. As illustrated in FIG. 36, the server 10 includes a CPU 150, a read only memory (ROM) 152, a random access memory (RAM) 154, a bus 156, an interface 158, an input device 160, an output device 162, a storage device 164, and a communication device 166.

The CPU 150 functions as an arithmetic processing device and a control device, and controls overall operations in the server 10 according to various programs. Further, the CPU 150 implements functions of the control unit 100 in the server 10. Note that the CPU 150 is composed of a processor such as a microprocessor.

The ROM 152 stores programs to be used by the CPU 150, control data such as operation parameters, and the like.

The RAM 154 temporarily stores, for example, programs to be executed by the CPU 150, data in use, and the like.

The bus 156 is composed of a CPU bus or the like. The bus 156 connects the CPU 150, the ROM 152, and the RAM 154 to one another.

The interface 158 connects the input device 160, the output device 162, the storage device 164, and the communication device 166 to the bus 156.

The input device 160 is composed of: input means for causing a user to input information, for example, such as a touch panel, a button, a switch, a lever, and a microphone; and an input control circuit that generates an input signal based on an input by the user and outputs the input signal to the CPU 150.

The output device 162 includes a display device, for example, such as a projector and a display such as an LCD and an OLED. Further, the output device 162 includes a speech output device such as a speaker.

The storage device 164 is a device for storing data, the storage device 164 functioning as the storage unit 122. The storage device 164 includes, for example, a storage medium, a recording device that records data in the storage medium, a reading device that reads the data from the storage medium, a deletion device that deletes the data recorded in the storage medium, or the like.

The communication device 166 is a communication interface composed of, for example, a communication device (for example, a network card or the like) for connecting to the communication network 22 or the like. Further, the communication device 166 may be a wireless LAN-compatible communication device, a long term evolution (LTE)-compatible communication device, or a wired communication device that performs wired communication. The communication device 166 functions as the communication unit 120.

5. Modifications

The preferred embodiments of the present disclosure have been described above in detail with reference to the accompanying drawings; however, the present disclosure is not limited to such examples. It is obvious that those having ordinary knowledge in the technical field to which the present disclosure pertains can conceive various modifications or alterations within the scope of the technical idea described in the claims, and it is understood that these also naturally fall within the technical scope of the present disclosure.

5-1. First Modification

For example, the configuration of the terminal 20 is not limited to the example illustrated in FIG. 2. As an example, the terminal 20 may include all the components included in the control unit 100 of the server 10 mentioned above. In this case, the information processing apparatus according to the present disclosure may be the terminal 20. Further, in this modification, the server 10 does not necessarily have to be installed.

5-2. Second Modification

As another modification, the information processing apparatus according to the present disclosure is not limited to the server 10, and may be another apparatus including all the components included in the control unit 100 of the server 10 mentioned above. For example, the information processing apparatus may be a general-purpose personal computer (PC), a tablet terminal, a game machine, a mobile phone such as a smartphone, a portable music player, a speaker, a projector, a wearable device such as a head-mounted display (HMD) and a smart watch, an in-vehicle device (such as a car navigation device), or a robot (for example, such as a humanoid robot or an autonomous vehicle).

5-3. Third Modification

The respective steps in the flow of processing in each embodiment mentioned above does not necessarily have to be performed in the order described. For example, the respective steps may be processed in an appropriately changed order. Further, the respective steps may be partially processed in parallel or individually instead of being processed in time series. In addition, some of the described steps may be omitted, or another step may be further added.

Further, according to each of the above-mentioned embodiments, it is also possible to provide a computer program for causing hardware such as the CPU 150, the ROM 152, and the RAM 154 to exert the same functions as those of the respective components of the server 10 according to the present embodiment. Further, a storage medium in which the computer program is recorded is also provided.

Further, the effects described in this description are merely illustrative or exemplary, and are not restrictive. That is, the technology according to the present disclosure can exhibit other effects that are obvious to those skilled in the art from the description in the present description, in addition to or instead of the above effects.

Note that the following configurations also fall within the technical scope of the present disclosure (1)

An information processing apparatus comprising:
a learning unit configured to learn, based on a determination result as to whether or not a second speech collected at second timing after first timing is a restatement of a first speech collected at the first timing, a meaning corresponding to a speech recognition result of the first speech.

(2)

The information processing apparatus according to (1), wherein the learning unit further learns the meaning corresponding to the speech recognition result of the first speech based on a meaning corresponding to a speech recognition result of the second speech.

(3)

The information processing apparatus according to (2), wherein, when it is determined that the second speech is a restatement of the first speech, the learning unit learns the meaning corresponding to the speech recognition result of the first speech based on the meaning corresponding to the speech recognition result of the second speech, and
wherein, when it is determined that the second speech is not a restatement of the first speech, the learning unit does not learn the meaning corresponding to the speech recognition result of the first speech.

(4)

The information processing apparatus according to (3), wherein when it is determined that the second speech is a restatement of the first speech, it is impossible to specify the meaning corresponding to the speech recognition result of the first speech, and it is possible to specify the meaning corresponding to the speech recognition result of the second speech, then the learning unit learns the meaning corresponding to the speech recognition result of the first speech based on the meaning corresponding to the speech recognition result of the second speech.

(5)

The information processing apparatus according to (4), wherein the learning unit learns the meaning corresponding to the speech recognition result of the first speech so that the meaning corresponding to the speech recognition result of the first speech becomes the same as the meaning corresponding to the speech recognition result of the second speech.

(6)

The information processing apparatus according to any one of (2) to (5), wherein the learning unit further determines whether or not to learn the meaning corresponding to the speech recognition result of the first speech based on a relationship between a context at the first timing and a context at the second timing.

(7)

The information processing apparatus according to (6), wherein, when it is determined that a predetermined evaluation value regarding a difference between the context at the first timing and the context at the second timing satisfies a predetermined condition, the learning unit determines not to learn the meaning corresponding to the speech recognition result of the first speech, and
wherein, when it is determined that the predetermined evaluation value regarding the difference between the context at the first timing and the context at the second timing does not satisfy the predetermined condition, the learning unit determines to learn the meaning corresponding to the speech recognition result of the first speech based on the meaning corresponding to the speech recognition result of the second speech.

(8)

The information processing apparatus according to (6) or (7),
wherein the first speech is a first utterance,
wherein the second speech is a second utterance, and
wherein the learning unit further determines whether or not to learn the meaning corresponding to a speech recognition result of the first utterance based on a success frequency of past restatements of a speaker of the second utterance or a frequency of use of speech input of the speaker of the second utterance.

(9)

The information processing apparatus according to any one of (6) to (8), wherein the learning unit further determines whether or not to learn the meaning corresponding to the speech recognition result of the first speech based on a predetermined evaluation value regarding a difference between non-verbal information of the second speech and non-verbal information of the first speech.

(10)

The information processing apparatus according to any one of (6) to (9), wherein the first speech is a first utterance, wherein the second speech is a second utterance, and wherein, when having determined to learn the meaning corresponding to the speech recognition result of the first utterance, the learning unit further determines one or more first users, in each of which a meaning of substantially the same utterance as the first utterance is determined to be the same as a learning result of the meaning corresponding to the speech recognition result of the first utterance when substantially the same utterance as the first utterance is made, based on a determination result as to whether or not a speaker of the second utterance is accustomed to speech input.

(11)

The information processing apparatus according to any one of (6) to (10), wherein the first speech is a first utterance, wherein the second speech is a second utterance, and wherein, when having determined to learn the meaning corresponding to the speech recognition result of the first utterance, the learning unit further determines one or more first users, in each of which a meaning of substantially the same utterance as the first utterance is determined to be the same as a learning result of the meaning corresponding to the speech recognition result of the first utterance when substantially the same utterance as the first utterance is made, as one or more users who belong to the same community as a speaker of the second utterance.

(12)

The information processing apparatus according to (10) or (11), wherein the learning unit dynamically increases or decreases the one or more first users based on a predetermined criterion.

(13)

The information processing apparatus according to (12), wherein, when having determined to add one or more second users to the one or more first users, the learning unit inquires at least one of the one or more first users about whether or not the one or more second users are permitted to be added, and wherein, when having obtained an answer indicating that the one or more second users are permitted to be added, the learning unit adds the one or more second users to the one or more first users.

(14)

The information processing apparatus according to any one of (6) to (13), wherein the first speech is a first utterance, wherein the second speech is a second utterance, and when it is determined that the second utterance is a restatement of the first utterance, and it is determined that a third utterance collected at third timing after the second timing is also a restatement of the first utterance, then based on either the meaning corresponding to the speech recognition result of the second utterance or a meaning corresponding to a speech recognition result of the third utterance, the learning unit learns the meaning corresponding to the speech recognition result of the first utterance.

(15)

The information processing apparatus according to (14), wherein, based on information indicating a relationship between the speaker of the first utterance and the speaker of the second utterance and information indicating a relationship between the speaker of the first utterance and the speaker of the third utterance, the learning unit selects either the meaning corresponding to the speech recognition result of the second utterance and the meaning corresponding to the speech recognition result of the third utterance as a base for learning the meaning corresponding to the speech recognition result of the first utterance.

(16)

The information processing apparatus according to (14) or (15), wherein, based on a comparison between a degree of abstraction of the meaning corresponding to the speech recognition result of the second utterance and a degree of abstraction of the meaning corresponding to the speech recognition result of the third utterance, the learning unit selects either the meaning corresponding to the speech recognition result of the second utterance and the meaning corresponding to the speech recognition result of the third utterance as the base for learning the meaning corresponding to the speech recognition result of the first utterance.

(17)

The information processing apparatus according to any one of (1) to (16), further comprising an output control unit configured, when the learning unit has learned the meaning corresponding to the speech recognition result of the first speech, to cause an output unit to output a notice indicating that the meaning corresponding to the speech recognition result of the first speech has already been learned.

(18)

The information processing apparatus according to (17), further comprising a determination unit configured to determine whether or not the second speech is a restatement of the first speech based on a result of a semantic analysis of the second speech, wherein the learning unit further learns the meaning corresponding to the speech recognition result of the first speech based on a result of the determination by the determination unit.

(19)

An information processing method comprising:

causing a processor to learn, based on a determination result as to whether or not a second speech collected at second timing after first timing is a restatement of a first speech collected at the first timing, a meaning corresponding to a speech recognition result of the first speech.

(20)

A program for causing a computer to function as a learning unit configured to learn, based on a determination result as to whether or not a second speech collected at second timing after first timing is a restatement of a first speech collected at the first timing, a meaning corresponding to a speech recognition result of the first speech.

REFERENCE SIGNS LIST

10 SERVER
20 TERMINAL
22 COMMUNICATION NETWORK
100, 200 CONTROL UNIT
102 SPEECH RECOGNITION UNIT
104 SEMANTIC ANALYSIS UNIT

106 RESTATEMENT DETERMINATION UNIT
108 LEARNING UNIT
110 OUTPUT CONTROL UNIT
120, 220 COMMUNICATION UNIT
122, 226 STORAGE UNIT
222 SENSOR UNIT
224 OUTPUT UNIT

The invention claimed is:

1. An information processing apparatus comprising:
circuitry configured to
learn a meaning corresponding to a speech recognition result of a first speech performed by a first user, based on a determination result as to whether or not a second speech performed by a second user collected at second timing after first timing is a restatement of the first speech collected at the first timing;
determine whether the second user belongs to an application range of users which a learning result of the meaning is applied to, based on a relationship with the first user and the second user; and
perform, to the second user, an operation corresponding to the learning result of the meaning, under a condition that the second user belongs to the application range.

2. The information processing apparatus according to claim 1, wherein the circuitry is further configured to learn the meaning corresponding to the speech recognition result of the first speech based on a meaning corresponding to a speech recognition result of the second speech.

3. The information processing apparatus according to claim 2,
wherein, when it is determined that the second speech is a restatement of the first speech, the circuitry is configured to learn the meaning corresponding to the speech recognition result of the first speech based on the meaning corresponding to the speech recognition result of the second speech, and
wherein, when it is determined that the second speech is not a restatement of the first speech, the circuitry does not learn the meaning corresponding to the speech recognition result of the first speech.

4. The information processing apparatus according to claim 3, wherein when it is determined that the second speech is a restatement of the first speech, it is impossible to specify the meaning corresponding to the speech recognition result of the first speech, and it is possible to specify the meaning corresponding to the speech recognition result of the second speech, then the circuitry is configured to learn the meaning corresponding to the speech recognition result of the first speech based on the meaning corresponding to the speech recognition result of the second speech.

5. The information processing apparatus according to claim 4, wherein the circuitry is configured to learn the meaning corresponding to the speech recognition result of the first speech so that the meaning corresponding to the speech recognition result of the first speech becomes the same as the meaning corresponding to the speech recognition result of the second speech.

6. The information processing apparatus according to claim 2, wherein the circuitry is further configured to determine whether or not to learn the meaning corresponding to the speech recognition result of the first speech based on a relationship between a context at the first timing and a context at the second timing.

7. The information processing apparatus according to claim 6,
wherein, when it is determined that a predetermined evaluation value regarding a difference between the context at the first timing and the context at the second timing satisfies a predetermined condition, the circuitry is configured to determine not to learn the meaning corresponding to the speech recognition result of the first speech, and
wherein, when it is determined that the predetermined evaluation value regarding the difference between the context at the first timing and the context at the second timing does not satisfy the predetermined condition, the circuitry is configured to determine to learn the meaning corresponding to the speech recognition result of the first speech based on the meaning corresponding to the speech recognition result of the second speech.

8. The information processing apparatus according to claim 6,
wherein the first speech is a first utterance,
wherein the second speech is a second utterance, and
wherein the circuitry is further configured to determine whether or not to learn the meaning corresponding to a speech recognition result of the first utterance based on a success frequency of past restatements of a speaker of the second utterance or a frequency of use of speech input of the speaker of the second utterance.

9. The information processing apparatus according to claim 6, wherein the circuitry is further configured to determine whether or not to learn the meaning corresponding to the speech recognition result of the first speech based on a predetermined evaluation value regarding a difference between non-verbal information of the second speech and non-verbal information of the first speech.

10. The information processing apparatus according to claim 6,
wherein the first speech is a first utterance performed by the first user,
wherein the second speech is a second utterance performed by the second user, and
wherein the circuitry is configured to determine that the second user belongs to the application range of users which the learning result of the meaning is applied to, based on the relationship with the first user and the second user, when the second user belongs to a same community with the first user, the community including a game community.

11. The information processing apparatus according to claim 6, wherein the circuitry is configured to dynamically add a target user to the application range of users, based on a predetermined criterion including at least one of a length of time during which an orientation of a body or a line of sight of the target user facing the first user, a number of turns taken in a conversation between the target user and the first user, and a status of the target user in a chat group with the first user.

12. The information processing apparatus according to claim 11,
wherein, when having determined to add one or more second users to the application range of users, the circuitry is configured to inquiry the first user about whether or not the one or more second users are permitted to be added, and
wherein, when having obtained an answer indicating that the one or more second users are permitted to be added, the circuitry is configured to add the one or more second users to the application range of users.

13. The information processing apparatus according to claim 6,
wherein the first speech is a first utterance,
wherein the second speech is a second utterance, and when it is determined that the second utterance is a restatement of the first utterance, and it is determined that a third utterance collected at third timing after the second timing is also a restatement of the first utterance, then based on either the meaning corresponding to the speech recognition result of the second utterance or a meaning corresponding to a speech recognition result of the third utterance, the circuitry is configured to learn the meaning corresponding to the speech recognition result of the first utterance.

14. The information processing apparatus according to claim 13, wherein, based on a comparison between a degree of abstraction of the meaning corresponding to the speech recognition result of the second utterance and a degree of abstraction of the meaning corresponding to the speech recognition result of the third utterance, the circuitry is configured to select either the meaning corresponding to the speech recognition result of the second utterance and the meaning corresponding to the speech recognition result of the third utterance as the base for learning the meaning corresponding to the speech recognition result of the first utterance.

15. The information processing apparatus according to claim 6, wherein the circuitry is further output, when the circuitry has learned the meaning corresponding to the speech recognition result of the first speech, a notice indicating that the meaning corresponding to the speech recognition result of the first speech has already been learned.

16. The information processing apparatus according to claim 15, wherein the circuitry is configured to determine whether or not the second speech is a restatement of the first speech based on a result of a semantic analysis of the second speech, wherein the circuitry is further lean the meaning corresponding to the speech recognition result of the first speech based on a result of the determination.

17. The information processing apparatus according to claim 6, wherein the relationship with the first user and the second user includes at least one of a distance between the second user and the first user, a distance between the second user and the information processing apparatus, a matching degree of a topic of the context of the first speech to the second user, and a family relationship.

18. The information processing apparatus according to claim 6, wherein the operation corresponding to the learning result of the meaning includes at least one of playing a video corresponding to the context of the first speech and outputting sound corresponding to the context of the first speech.

19. An information processing method comprising:
learning a meaning corresponding to a speech recognition result of a first speech performed by a first user, based on a determination result as to whether or not a second speech performed by a second user collected at second timing after first timing is a restatement of the first speech collected at the first timing;
determining whether the second user belongs to an application range of users which a learning result of the meaning is applied to, based on a relationship with the first user and the second user; and
performing, to the second user, an operation corresponding to the learning result of the meaning, under a condition that the second user belongs to the application range.

20. A non-transitory computer-readable storage medium including computer executable instructions, wherein the instructions, when executed by an information processing s stem cause the information processing system to perform a method, the method comprising:
learning a meaning corresponding to a speech recognition result of a first speech performed by a first user, based on a determination result as to whether or not a second speech performed by a second user collected at second timing after first timing is a restatement of the first speech collected at the first timing;
determining whether the second user belongs to an application range of users which a learning result of the meaning is applied to, based on a relationship with the first user and the second user; and
performing, to the second user, an operation corresponding to the learning result of the meaning, under a condition that the second user belongs to the application range.

* * * * *